US008379156B2

(12) United States Patent
Nakamura et al.

(10) Patent No.: US 8,379,156 B2
(45) Date of Patent: Feb. 19, 2013

(54) DIGITAL BROADCAST RECEPTION DEVICE, DIGITAL BROADCAST RECEPTION METHOD AND PROGRAM

(75) Inventors: Koji Nakamura, Kanagawa (JP); Toshio Oka, Kanagawa (JP)

(73) Assignee: Panasonic Corporation, Osaka (JP)

(*) Notice: Subject to any disclaimer, the term of this patent is extended or adjusted under 35 U.S.C. 154(b) by 2 days.

(21) Appl. No.: 13/139,357

(22) PCT Filed: Dec. 25, 2009

(86) PCT No.: PCT/JP2009/007255
§ 371 (c)(1),
(2), (4) Date: Jun. 13, 2011

(87) PCT Pub. No.: WO2010/073703
PCT Pub. Date: Jul. 1, 2010

(65) Prior Publication Data
US 2011/0249126 A1 Oct. 13, 2011

(30) Foreign Application Priority Data
Dec. 25, 2008 (JP) ................................. 2008-331458

(51) Int. Cl.
*H04N 5/50* (2006.01)
*H04N 5/44* (2006.01)
(52) U.S. Cl. ......................................... 348/731; 348/725
(58) Field of Classification Search .......... 348/731–733, 348/725; 725/131, 139, 151, 39; *H04N 5/50, H04N 5/44*
See application file for complete search history.

(56) References Cited

U.S. PATENT DOCUMENTS

| 2007/0097272 | A1* | 5/2007 | Moradi et al. ................. 348/731 |
| 2008/0005774 | A1 | 1/2008 | Okada et al. |
| 2009/0073321 | A1* | 3/2009 | Sullivan et al. ............... 348/725 |
| 2010/0039559 | A1* | 2/2010 | Cheng et al. .................. 348/731 |
| 2011/0205443 | A1 | 8/2011 | Kawai et al. |

FOREIGN PATENT DOCUMENTS

| JP | 11-122547 | 4/1999 |
| JP | 2004-112504 | 4/2004 |
| JP | 2007-174498 | 7/2007 |
| JP | 2008-011445 | 1/2008 |
| JP | 2008-153940 | 7/2008 |

OTHER PUBLICATIONS

International Search Report in PCT/JP2009/007255, dated Mar. 30, 2010.

* cited by examiner

*Primary Examiner* — Sherrie Hsia
(74) *Attorney, Agent, or Firm* — Greenblum & Bernstein, P.L.C.

(57) ABSTRACT

Disclosed are a digital broadcast reception device, a digital broadcast reception method and a program that shorten the period during which display is not possible that occurs when channels are switched. The digital broadcast reception device (100) is provided with a data acquisition unit (111) that measures data related to the data reception waiting that occurs in channel switch processing, a channel switch-directing unit (110) that controls the timing of operation of the data acquisition unit (111), a parameter-generating unit (112) that generates control parameters based on the data acquired by the data acquisition unit (111), a processing time-calculating unit (113) that calculates the channel switching time based on the control parameters generated by the parameter-generating unit (112), and a channel switch-timing control unit (114); that controls the timing for starting channel switching to shorten the data reception wait time that occurs during channel switching based on the channel switching time calculated by the processing time-calculating unit (113).

19 Claims, 29 Drawing Sheets

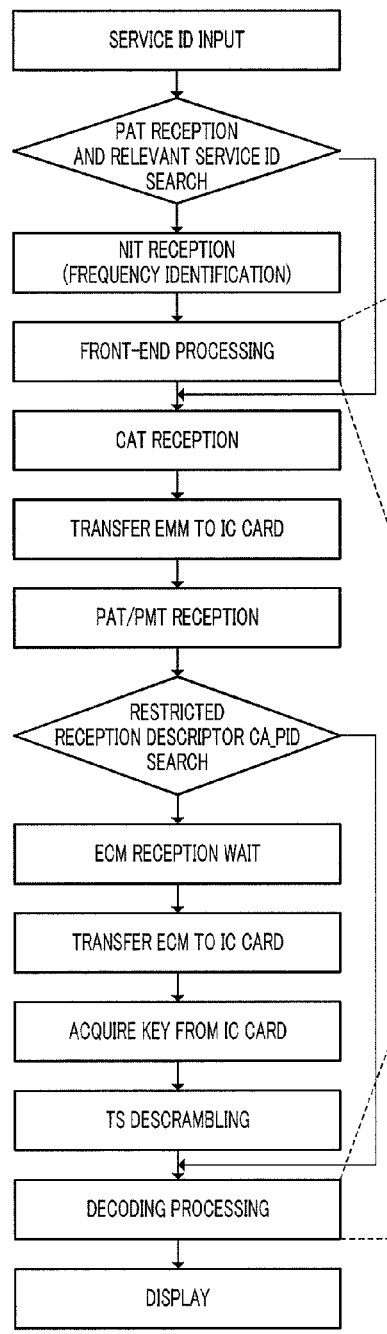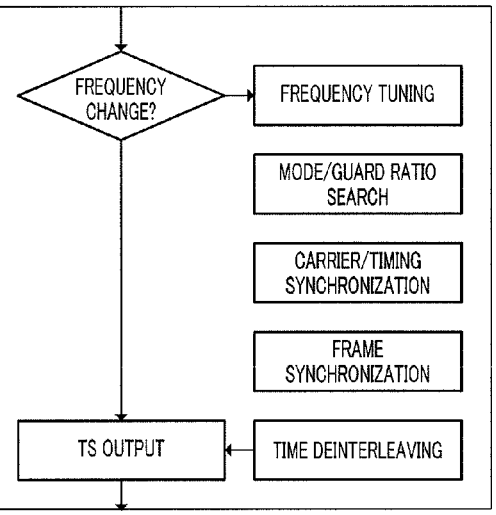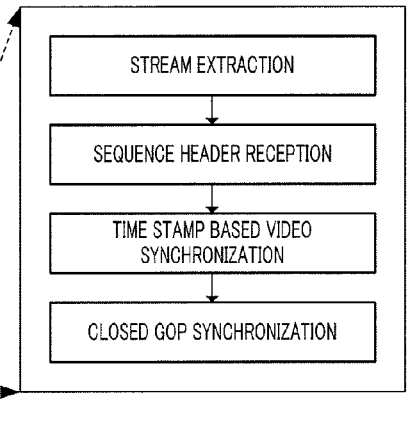
FIG.1B
FIG.1C
FIG.1A

ELEMENTARY PID DETAILS

TIME NECESSARY FOR CHANNEL
SWITCHING PROCESSING

| X[ms] | Y[ms] |
|---|---|
| 600 | 10 |

X = TIME PERIOD FROM START OF FRONT-END
   PROCESSING UNTIL ECM_PID ACQUISITION
Y = TIME PERIOD FROM ECM RECEPTION UNTIL
   COMPLETION OF DESCRAMBLING

FIG.16A

INFORMATION RELATING TO
ECM RECEPTION

| REFERENCE TIME | ECM RECEPTION INTERVAL [ms] |
|---|---|
| 14:00:15:20 | 100 |

FIG.16B

INFORMATION RELATING TO SEQUENCE
HEADER RECEPTION OF EACH CHANNEL

| CHANNEL NUMBER | REFERENCE TIME | SEQUENCE HEADER INTERVAL [ms] |
|---|---|---|
| D011 | 14:20:20.0 | 450 |
| D021 | 14:20:25.0 | 500 |
| D031 | 14:20:30.0 | 500 |
| D041 | 14:20:35.0 | 450 |
| D051 | 14:20:40.0 | 500 |
| D061 | 14:20:45.0 | 400 |
| D071 | 14:20:50.0 | 500 |

FIG.16C

| CHANNEL SWITCHING START TIMING | CHANNEL SWITCHING TIME [msec] |
|---|---|
| 14:25:0:0.20 | 980 |
| 14:25:0:0.320 | 680 |

FIG.17

| SEQUENCE HEADER RECEPTION TIME |
|---|
| 14:25:1:0 |

FIG.18

| TUNER ID | ASSIGNED CHANNEL |
|---|---|
| 1 | D011 |
| 2 | — |

| D011 | | |
|---|---|---|
| TIME | PROGRAM TITLE | PERFORMER/PARTICIPANT |
| 11:00~12:00 | FIVE-MINUTE COOKING | HANAKO YAMADA |
| 12:00~13:00 | WHIRLWIND VOLCANO | TARO YAMADA |
| 13:00~14:00 | DRAMA SPECIAL 1 | TAKU KIMURA |
| 14:00~15:00 | DRAMA SPECIAL 2 | TAKU KIMURA |
| ⋮ | ⋮ | ⋮ |

FIG.26A

| D011-1 | | |
|---|---|---|
| TIME | PROGRAM TITLE | PERFORMER/PARTICIPANT |
| 12:00~14:00 | F LEAGUE | |
| | | |

FIG.26B

| CHANNEL NUMBER | FREQUENCY [MHz] |
|---|---|
| D011-0 | 470 |
| D011-2 | 470 |
| D021 | 486 |
| D031 | 520 |
| D041 | 540 |
| D051 | 560 |
| D061 | 470 |
| D071 | 600 |

* X' WRITE FLAG SET WHEN 1
  X' WRITE FLAG CLEARED WHEN 0

TIME NECESSARY FOR CHANNEL SWITCHING PROCESSING

| X[ms] | X' [ms] | Y[ms] |
|---|---|---|
| 600 | 300 | 10 |

X, X' = TIME PERIOD FROM START OF FRONT-END
PROCESSING UNTIL ECM_PID ACQUISITION
Y = TIME PERIOD FROM ECM RECEPTION UNTIL
COMPLETION OF DESCRAMBLING

FIG.31A

INFORMATION RELATING TO ECM RECEPTION

| REFERENCE TIME | ECM RECEPTION INTERVAL [ms] |
|---|---|
| 14:20:15:20 | 100 |

FIG.31B

INFORMATION RELATING TO SEQUENCE
HEADER RECEPTION OF EACH CHANNEL

| CHANNEL NUMBER | REFERENCE TIME | SEQUENCE HEADER INTERVAL [ms] |
|---|---|---|
| D011-0 | 14:20:20.0 | 450 |
| D011-1 | 14:20:23.0 | 450 |
| D021 | 14:20:25.0 | 500 |
| D031 | 14:20:30.0 | 500 |
| D041 | 14:20:35.0 | 450 |
| D051 | 14:20:40.0 | 500 |
| D061 | 14:20:45.0 | 400 |
| D071 | 14:20:50.0 | 500 |

FIG.31C

| D011-0 | | |
|---|---|---|
| TIME | PROGRAM TITLE | PERFORMER/PARTICIPANT |
| 11:00~12:00 | FIVE-MINUTE COOKING | HANAKO YAMADA |
| 12:00~13:00 | WHIRLWIND VOLCANO | TARO YAMADA |
| 13:00~14:00 | DRAMA SPECIAL 1 | TAKU KIMURA |
| 14:00~15:00 | DRAMA SPECIAL 2 | TAKU KIMURA |
| ⋮ | ⋮ | ⋮ |

FIG.34A

| D011-1 | | |
|---|---|---|
| TIME | PROGRAM TITLE | PERFORMER/PARTICIPANT |
| 12:00~14:00 | F LEAGUE | |

FIG.34B

DIGITAL BROADCAST RECEPTION DEVICE, DIGITAL BROADCAST RECEPTION METHOD AND PROGRAM

TECHNICAL FIELD

The present invention relates to a digital broadcast reception apparatus, digital broadcast reception method, and program for receiving digital broadcasting. More particularly, the present invention relates to improvement of a channel switching control method that can be applied to a digital broadcast reception apparatus.

BACKGROUND ART

In recent years, rapid progress has been made in the spread of BS (Broadcast Satellite) and CS (Communication Satellite) digital broadcasting, or terrestrial digital broadcasting, and many devices equipped with a digital broadcast reception function are available, including digital TVs, recorders, and portable terminals. Channel switching processing during digital broadcast reception performed by such digital broadcast reception apparatuses requires control information that is inserted periodically into a signal transmitted from a broadcasting station. The wait time for receiving this data causes lengthening of a time period during which display is not possible.

In channel switching processing during digital broadcast reception, program identification information (PAT (Program Association Table) and PMT (Program Map Table)) reception processing, ECM (Entitlement Control Message) reception processing, and sequence header reception processing, are essential. This processing causes lengthening of a time period during which display is not possible (a time period during which preparatory processing for displaying selected channel video is performed after channel switching occurs).

A PAT and PMT are sent from a broadcasting station in approximately 100 msec unit cycles. PAT and PMT acquisition processing is performed at random timing unrelated to this sending cycle, and therefore a reception wait time of up to 100 msec occurs.

As with a PAT and PMT, an ECM is also sent from a broadcasting station in approximately 100 msec unit cycles. Here, too, ECM acquisition processing is performed at random timing unrelated to this sending cycle, and therefore a reception wait time of up to 100 msec occurs.

A reception wait time also occurs in sequence header reception processing. Data compressed by means of MPEG2 (Moving Picture Expert Group 2) encoding is composed of a GOP (Group Of Pictures) in which a plurality of pictures are grouped, there being three types of picture—I-picture, P-picture, and B-picture. An I-picture can be decoded by itself, a P-picture is a picture obtained by encoding a difference from a past picture, and a B-picture is obtained by encoding differences from data predicted from both past and future pictures.

A sequence header is placed immediately before an I-picture placed at the start of a GOP, and contains resolution (1920×1080, 1440×1080, etc.) and aspect ratio (16:9, 4:3) information as video information for a selected channel. Decoding processing at the time of channel switching processing can only start after this sequence header has been received and video information has been acquired. This sequence header is sent from a broadcasting station in approximately 500 msec unit cycles. Sequence header acquisition processing is performed at random timing unrelated to this sending cycle, and therefore a reception wait time of up to 500 msec occurs.

As described above, in a digital broadcast reception apparatus, program identification information (PAT (Program Association Table) and PMT (Program Map Table)) reception processing, ECM (Entitlement Control Message) reception processing, and sequence header reception processing, are essential in channel switching processing during digital broadcast reception. This processing causes lengthening of a time period during which display is not possible (a time period during which preparatory processing for displaying selected channel video is performed after channel switching occurs).

In Patent Literature 1, a method is disclosed whereby video data decoding processing is performed using cached program identification information intended to reduce wait time that occurs in program identification information reception processing. With the method described in Patent Literature 1, the use of cached program identification information makes hitherto executed program identification information acquisition processing unnecessary, and makes it possible to shorten a time period during which display is not possible that occurs at the time of channel switching.

CITATION LIST

Patent Literature

PTL 1
Japanese Patent Application Laid-Open No. 2008-11445

SUMMARY OF INVENTION

Technical Problem

However, with a conventional method of speeding up channel switching of this kind, the problems of ECM wait time and sequence header reception wait time still occur, and the resultant problem of lengthening of a time period during which display is not possible is not resolved.

It is therefore an object of the present invention to provide a digital broadcast reception apparatus, digital broadcast reception method, and program that shorten a time period during which display is not possible that occurs at the time of channel switching.

Solution to Problem

A digital broadcast reception apparatus of the present invention is provided with a reception section that receives digital broadcasting and a channel switching processing section that performs channel switching processing, and employs a configuration having: a data acquisition section that measures data relating to a data reception wait that occurs in the channel switching processing; a data acquisition timing control section that controls the timing of operation of the data acquisition section; a parameter generation section that generates a control parameter based on control information acquired by the data acquisition section; a processing time calculation section that calculates a channel switching time, which is a period of time necessary for channel switching obtained by subtracting a channel switching occurrence time from a channel switching completion time, based on a control parameter generated by the parameter generation section; and a channel switching timing control section that controls channel switching start timing so that a data reception wait time that occurs at the time of channel switching is shortened, based on a channel switching time calculated by the processing time calculation section.

A digital broadcast reception method of the present invention receives digital broadcasting and performs channel switching processing, and has: a step of measuring data relating to a data reception wait that occurs in the channel switching processing; a step of controlling the timing of the data acquisition operation; a step of generating a control parameter based on the acquired control information; a step of calculating a channel switching time, which is a period of time necessary for channel switching obtained by subtracting a channel switching occurrence time from a channel switching completion time, based on the generated control parameter; and a step of controlling channel switching start timing so that a data reception wait time that occurs at the time of channel switching is shortened, based on the calculated channel switching time.

From another viewpoint, the present invention is a program that causes a computer to execute a digital broadcast reception method that receives digital broadcasting and performs channel switching processing, the digital broadcast reception method having: a step of measuring data relating to a data reception wait that occurs in the channel switching processing; a step of controlling the timing of the data acquisition operation; a step of generating a control parameter based on the acquired control information; a step of calculating a channel switching time, which is a period of time necessary for channel switching obtained by subtracting a channel switching occurrence time from a channel switching completion time, based on the generated control parameter; and a step of controlling channel switching start timing so that a data reception wait time that occurs at the time of channel switching is shortened, based on the calculated channel switching time.

Advantageous Effects of Invention

The present invention can shorten a data reception wait time (a time period combining an ECM reception wait time and sequence header reception wait time) that occurs at the time of channel switching, and can shorten a time period during which display is not possible, by controlling channel switching start timing so that a data reception wait time that occurs at the time of channel switching is shortened. For example, when counterprogram channels displayed on a plurality of screens are sequentially switched automatically, the present invention can shorten the time until display, and can shorten the time period during which video is interrupted.

BRIEF DESCRIPTION OF DRAWINGS

FIG. 1 is a drawing for providing an overview of channel switching processing of a digital broadcast reception apparatus according to the present invention;

FIG. 16A is a drawing showing an example of control parameters necessary for controlling the front-end processing start timing of a digital broadcast reception apparatus according to above Embodiment 1;

FIG. 16B is a drawing showing an example of control parameters necessary for controlling the front-end processing start timing of a digital broadcast reception apparatus according to above Embodiment 1;

FIG. 16C is a drawing showing an example of control parameters necessary for controlling the front-end processing start timing of a digital broadcast reception apparatus according to above Embodiment 1;

FIG. 17 is a drawing showing channel switching start timing (a time at which channel switching is started), and a channel switching time at that time, of a digital broadcast reception apparatus according to above Embodiment 1;

FIG. 18 is a drawing showing a sequence header reception time of a digital broadcast reception apparatus according to above Embodiment 1;

FIG. 26A is a drawing showing an example of service information that implements data broadcasting provided by a broadcasting station of a digital broadcast reception apparatus according to above Embodiment 2;

FIG. 26B is a drawing showing an example of service information that implements data broadcasting provided by a broadcasting station of a digital broadcast reception apparatus according to above Embodiment 2;

FIG. 31A is a drawing showing an example of control parameters necessary for controlling the front-end processing start timing of a digital broadcast reception apparatus according to above Embodiment 3;

FIG. 31B is a drawing showing an example of control parameters necessary for controlling the front-end processing start timing of a digital broadcast reception apparatus according to above Embodiment 3;

FIG. 31C is a drawing showing an example of control parameters necessary for controlling the front-end processing start timing of a digital broadcast reception apparatus according to above Embodiment 3;

FIG. 34A is a drawing showing an example of service information that implements data broadcasting provided by a broadcasting station of a digital broadcast reception apparatus according to above Embodiment 3;

FIG. 34B is a drawing showing an example of service information that implements data broadcasting provided by a broadcasting station of a digital broadcast reception apparatus according to above Embodiment 3.

DESCRIPTION OF EMBODIMENTS

Now, embodiments of the present invention will be described in detail with reference to the accompanying drawings.

[Explanation of Principle]

First, a background explanation will be given of channel switching control to which the present invention is applied.

The present invention shortens a data reception wait time (a time period combining an ECM reception wait time and sequence header reception wait time) that occurs at the time of channel switching. Therefore, an overview of the technological background to channel switching processing will be given with reference to FIG. 1 through FIG. 10.

[Overview of DTV Channel Switching Processing]

FIG. 1 is a drawing providing an overview of DTV (digital broadcast reception apparatus) channel switching processing.

As shown in the flowchart in FIG. 1A, after service ID input, a DTV determines whether or not there is a relevant service ID search according to PAT reception. If there is no service ID search, NIT (Network Information Table) reception (frequency identification) and front-end processing are performed. If there is a service ID search, the processing flow proceeds directly to CAT reception and subsequent processing.

FIG. 1B is a flowchart showing details of the above front-end processing. In the above front-end processing, frequency change determination is performed, and in the case of a frequency change, the kinds of processing shown below are performed, and the processing flow proceeds to TS (Transport Stream) output processing. If there is no frequency change, the processing flow proceeds directly to TS output processing. In the case of a frequency change, frequency tuning processing, mode/guard ratio search processing, carrier/timing synchronization processing, frame synchronization processing, and time deinterleave processing are performed.

Returning to FIG. 1A, the processing comprises CAT reception, EMM IC card transfer processing, PAT/PMT reception processing, a restricted reception descriptor CA_PID (Conditional Access PID) search, ECM reception wait processing, processing for key acquisition from an IC card, and TS descrambling. Then, after decoding processing, image output processing (display) is performed, and DTV channel switching processing ends.

FIG. 1C is a flowchart showing details of the above decoding processing.

In the above decoding processing, stream extraction processing, sequence header reception processing, time stamp based video synchronization processing, and Closed GOP synchronization processing are performed.

The present invention improves a data reception wait time that occurs at the time of channel switching by means of the above ECM reception wait processing and the above sequence header reception processing.

Figure 2:
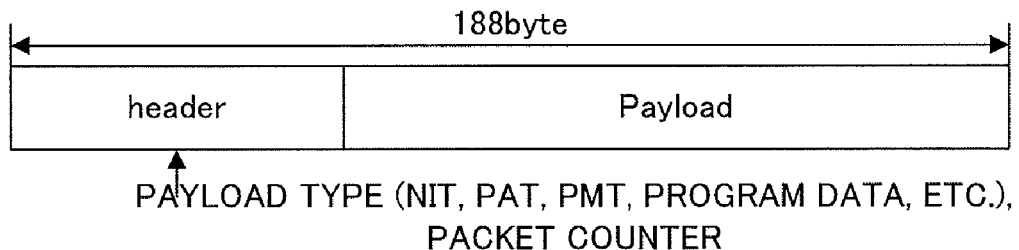
FIG. 2 is a drawing showing the structure of a TS packet of a digital broadcast reception apparatus according to the present invention.

FIG. 2 is a drawing showing the structure of a TS packet.

As shown in FIG. 2, a TS packet is composed of 188 bytes comprising a header and payload. Payload types include an NIT (Network Information Table), PAT (Program Association Table), PMT (Program Map Table), program data, and so forth. The header has a packet counter. Details of a TS are specified by ARIB STB-B32.

[NIT Reception Processing]

Figure 3:
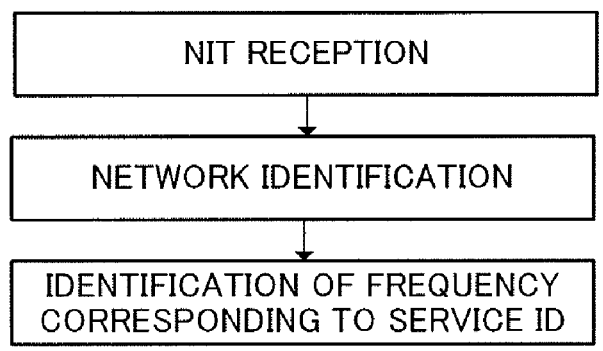
FIG. 3 is a flowchart showing NIT reception processing of a digital broadcast reception apparatus according to the present invention.

FIG. 3 is a flowchart showing NIT reception processing.

NIT reception processing is processing that receives an NIT, and identifies a frequency corresponding to a specified service ID.

Figure 4:
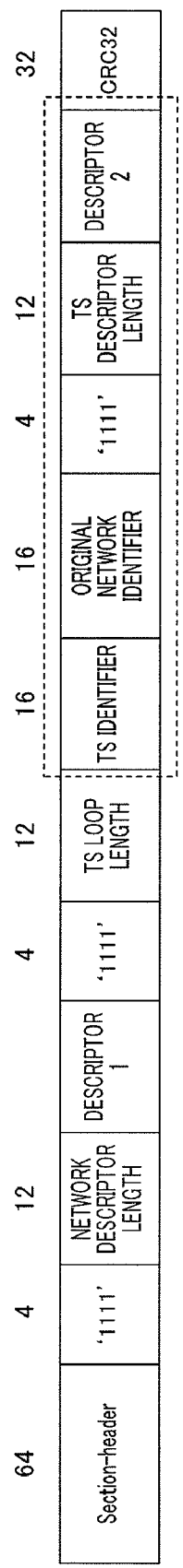
FIG. 4 is a drawing showing the structure of an NIT as an example of the data structure of an NIT of a digital broadcast reception apparatus according to the present invention.

As shown in the processing flow in FIG. 3, in NIT reception processing, (1) first, an NIT is received, then (2) a network ID is referenced and network identification is performed, and then (3) information of descriptor 2 (a terrestrial distribution system descriptor) shown in FIG. 4 is referenced, and a frequency corresponding to the service ID is identified.

FIG. 4 is a drawing showing an example of the data structure of an NIT. The numeric values in the drawing indicate data lengths (in bytes).

An NIT comprises information on a frequency used by a broadcaster and a broadcast program number identifier belonging to that frequency.

As shown in FIG. 4, an NIT is composed of a section-header, network descriptor length, descriptor 1, TS loop length, TS identifier, original network identifier, TS descriptor length, descriptor 2, and CRC (32 bits).

The above section-header includes a network ID for performing network (BS, CS, terrestrial digital, etc.) identification. The information surrounded by a dotted line in FIG. 4 includes information necessary for front-end processing (area code, center frequency, and so forth), and a service list (service ID, service type identifier). Descriptor 2 is described in ARIB STB-B32 Section 3, Chapter 3.

The NIT information sending cycle is once every 10 seconds. NIT information may be stored and managed in non-volatile memory.

[Program Identification Information Acquisition (PAT/PMT Acquisition) Processing]

Figure 5:
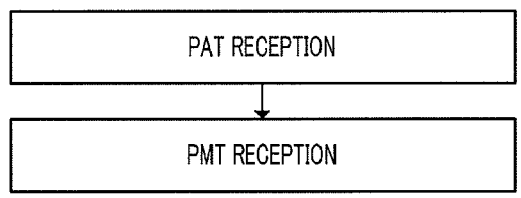
FIG. 5 is a flowchart showing program identification information acquisition processing of a digital broadcast reception apparatus according to the present invention.

FIG. 5 is a flowchart showing program identification information acquisition processing.

As shown in FIG. 5, in program identification information acquisition processing, (1) first, PAT information containing information of each channel is received, then (2) selected channel information is acquired based on a PMT PID identified in (1) above.

Figure 6:
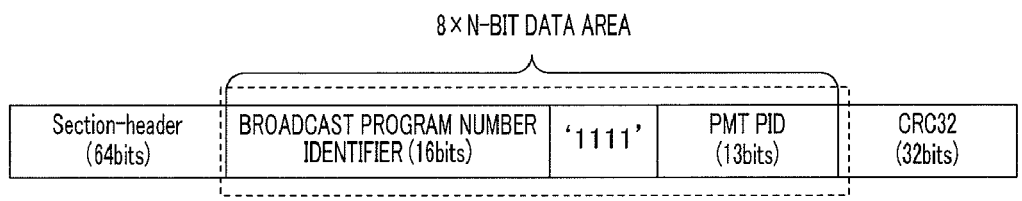
FIG. 6 is a drawing showing the structure of a PAT as an example of the data structure of a PAT of a digital broadcast reception apparatus according to the present invention.

FIG. 6 is a drawing showing an example of the data structure of a PAT.

A PAT specifies a PID of a TS packet that transmits a PMT relating to a broadcast program. A PAT is not transmitted divided into a plurality of sections.

As shown in FIG. 6, a PAT is composed of a section-header (64 bits), an 8xN-bit data area comprising a broadcast program number identifier (16 bits) and PMT PID (13 bits), and a CRC (32 bits).

A broadcast program number identifier is a value that identifies a program provided by a broadcaster. A PMT PID indicates a PID of a TS packet that transmits a PMT relating to a broadcast program.

Figure 7:
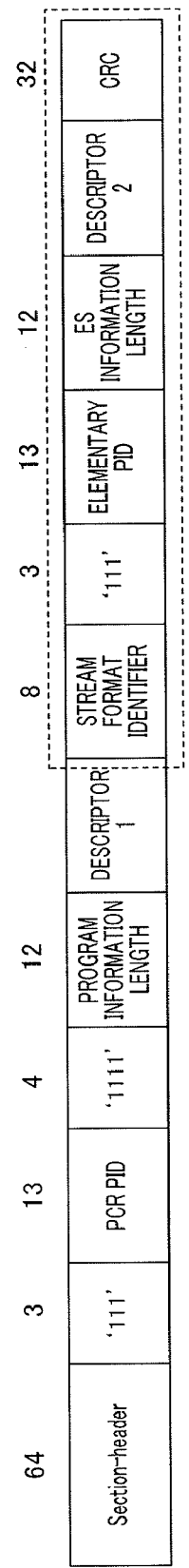
FIG. 7 is a drawing showing the structure of a PMT of a digital broadcast reception apparatus according to the present invention.

FIG. 7 is a drawing showing an example of the data structure of a PMT.

As shown in FIG. 7, a PMT is composed of a section-header, PCR PID, program information length, descriptor 1, stream format identifier, elementary PID, ES information length, descriptor 2, and CRC (32 bits).

A stream format identifier is used to identify the format of a broadcast program element—for example, 0x02: MPEG2 VIDEO; 0x0F: MPEG2 AAC; 0x06: subtitles/text superimposition; 0x0D: data broadcasting.

An elementary PID is a PID of a TS packet that transmits data relating to a stream.

Figure 8:
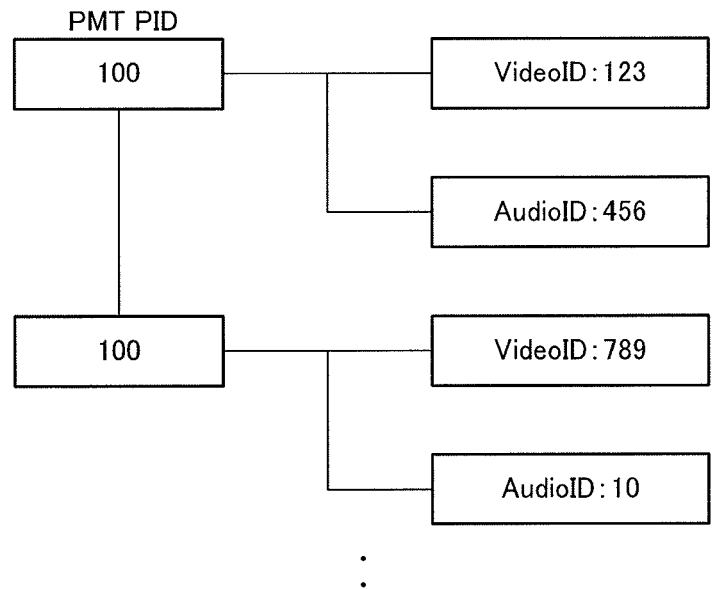
FIG. 8 is a drawing showing details of an Elementary PID of a digital broadcast reception apparatus according to the present invention.

FIG. 8 is a drawing showing details of an elementary PID.

As shown in FIG. 8, an elementary PID stores a VideoID and AudioID for each PMT PID.

[ECM Reception Wait Processing]

Figure 9:
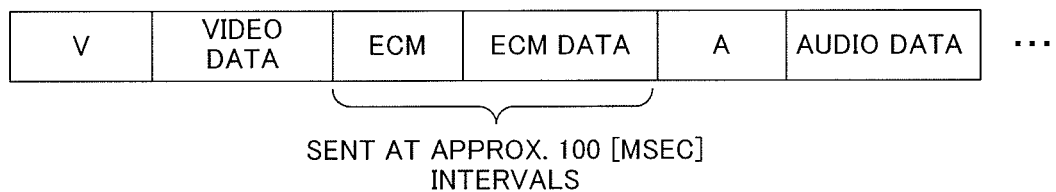
FIG. 9 is a drawing explaining ECM reception wait processing of a digital broadcast reception apparatus according to the present invention.

FIG. 9 is a drawing explaining ECM reception wait processing, and shows TS flow.

ECM reception wait processing is processing that receives an ECM in order to acquire a descrambling key from an IC card.

As shown in FIG. 9, an ECM and ECM data are sent from a broadcasting station as a TS at approximately 100 msec intervals. Since an ECM is sent from a broadcasting station as a TS in 100 msec units, it is necessary for a DTV to receive this. In reception processing, a maximum 100 msec wait time occurs.

[Sequence Header Reception Wait Processing]

Figure 10:
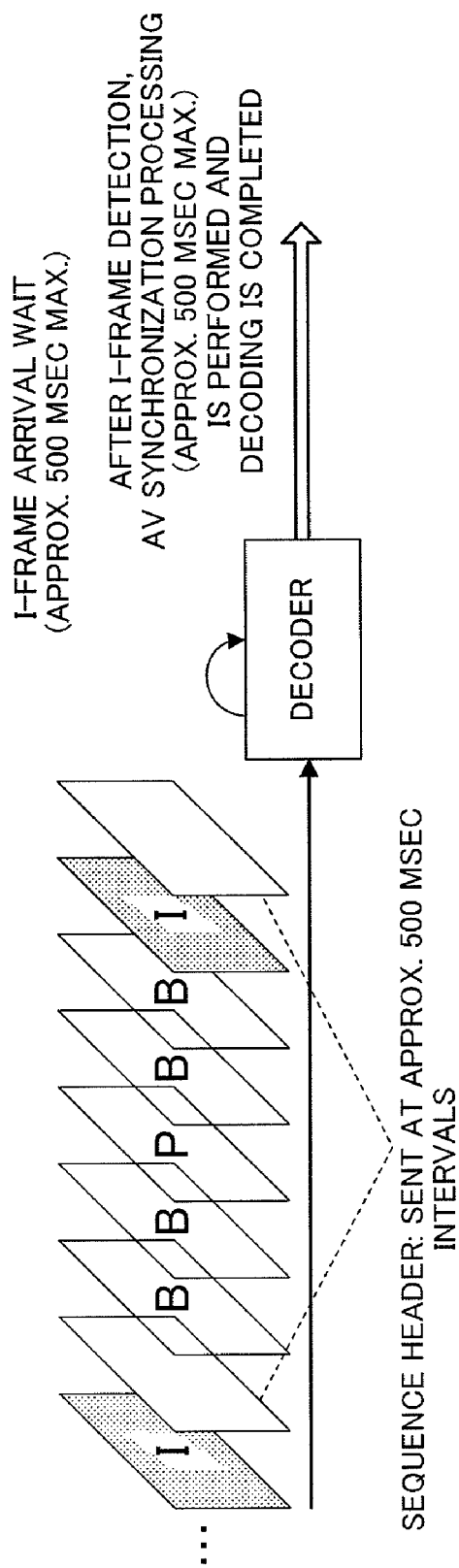
FIG. 10 is a drawing explaining sequence header reception wait processing of a digital broadcast reception apparatus according to the present invention.

FIG. 10 is a drawing explaining sequence header reception wait processing.

Processing that receives a sequence header is necessary in order to start decoding processing. This processing is sequence header reception wait processing.

As shown in FIG. 10, a sequence header is sent at approximately 500 msec intervals. Therefore, a wait for I-frame arrival is a maximum of approximately 500 msec.

A DTV decoder cannot start AV synchronization processing until a sequence header transmitted immediately before an I-frame is detected. After I-frame detection, the decoder performs AV synchronization processing (approximately 500 msec maximum) and completes decoding.

This concludes an outline description of channel switching processing.

The present invention shortens a time period combining an ECM reception wait time in the ECM reception wait processing in FIG. 1A and a sequence header reception wait time in the sequence header reception processing in FIG. 1B.

The basic concept of the present invention will now be explained.

Figure 11:
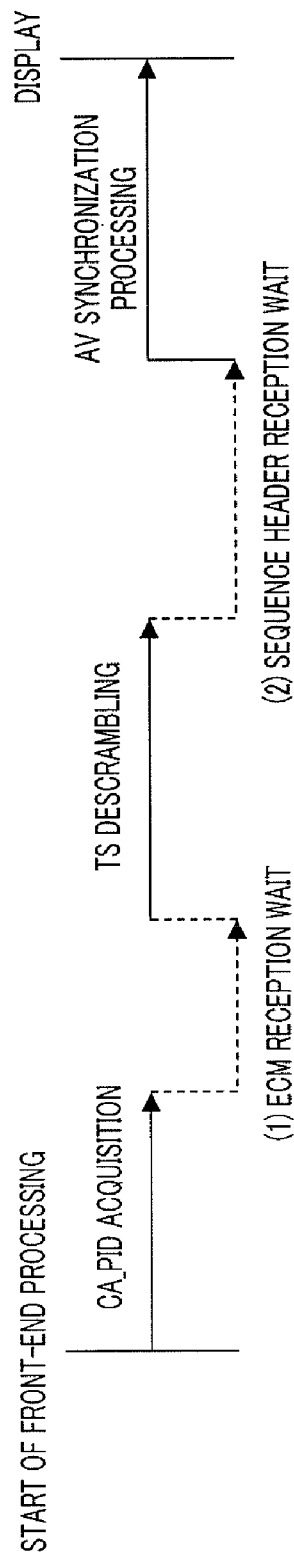
FIG. 11 is a drawing explaining a data reception wait time (a time period combining an ECM reception wait time and sequence header reception wait time) that occurs at the time of channel switching in a digital broadcast reception apparatus according to the present invention.

FIG. 11 is a drawing explaining a data reception wait time (a time period combining an ECM reception wait time and sequence header reception wait time) that occurs at the time of channel switching.

As shown in FIG. 11, from the start of front-end processing until display, a DTV executes CA_PID acquisition, TS descrambling, and AV synchronization processing. After CA_PID acquisition, an ECM reception wait occurs until TS descrambling is started, and after TS descrambling, a sequence header reception wait occurs until AV synchronization processing is started. Thus, in channel switching, two processing waits—an ECM reception wait and a sequence header reception wait—occur, and therefore display preparation takes time.

A feature of the present invention is that front-end processing start timing is controlled so as to minimize an ECM reception wait time and sequence header reception wait time.

Figure 12:
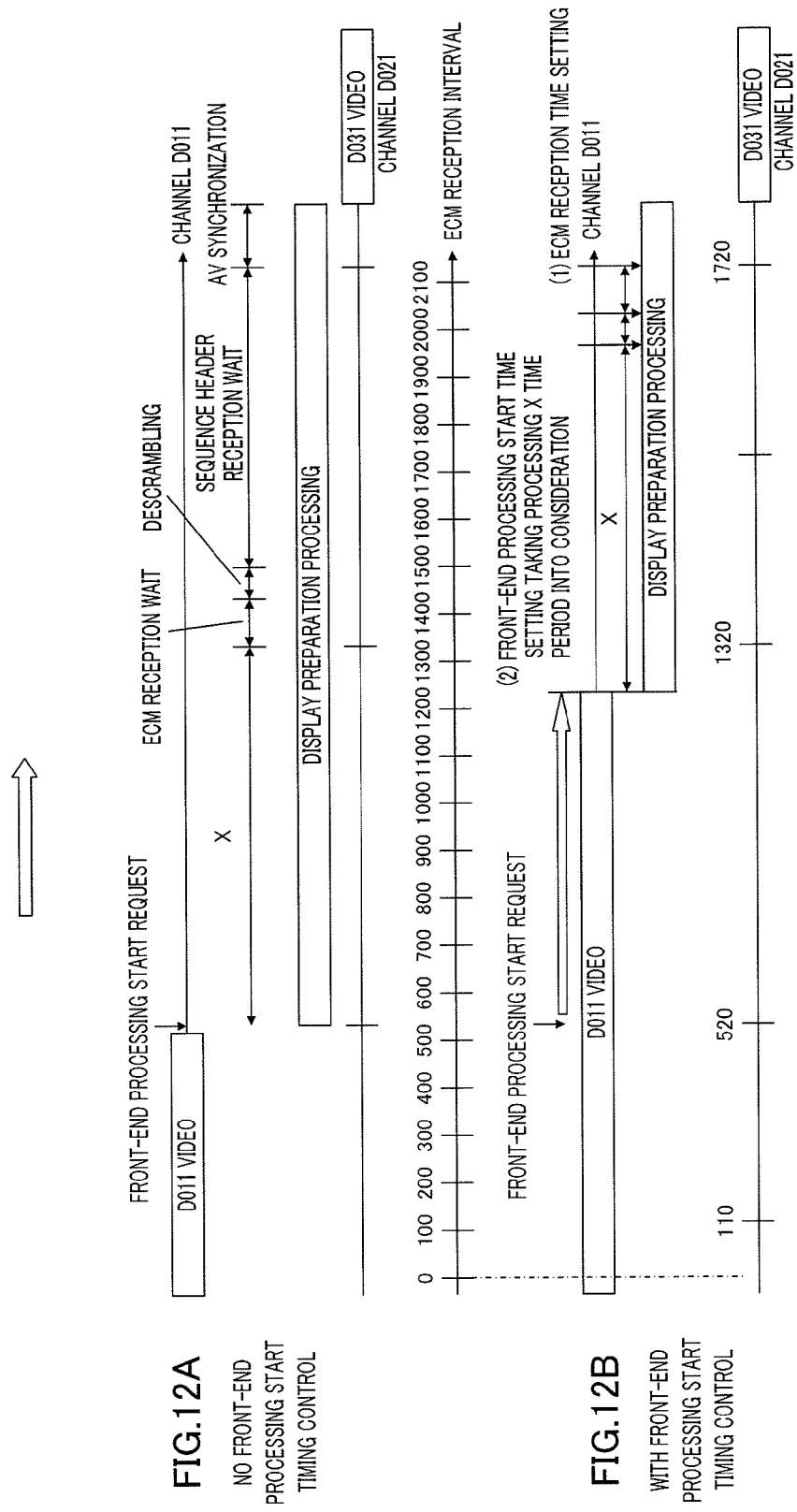
FIG. 12 is a timing chart explaining a front-end processing start timing control method.

FIG. 12 is a timing chart explaining a front-end processing start timing control method, in which FIG. 12A shows a case in which there is no front-end processing start timing control, and FIG. 12B shows a case in which there is front-end processing start timing control. A horizontal axis indicates an ECM reception interval.

An example is given here in which channel switching to D031 is performed during viewing of channel D011.

As shown in FIG. 12A, in the event of channel switching during viewing of channel D011, a front-end processing start request is issued. The channel is switched to channel D031 by performing display preparation processing. In this display preparation processing, CA_PID acquisition (hereinafter this time period is indicated by X), an ECM reception wait, descrambling, a sequence header reception wait, and AV synchronization are applied from the start of front-end processing.

As shown in FIG. 12B, front-end processing start timing control is actually as follows. Namely, (1) ECM reception time setting is performed and (2) a front-end processing start time is set taking a processing X time period into consideration. By this means, a display preparation processing time period is shortened, and channel D011 video can continue to be output until the front-end processing start time.

In order to control this front-end processing start timing, data of (1) the ECM reception timing and interval and (2) the sequence header reception timing and interval of each channel are acquired, and the acquired data are recorded as control parameters. The control parameter acquisition method and a recording example will be described later herein by means of an embodiment.

Figure 13:
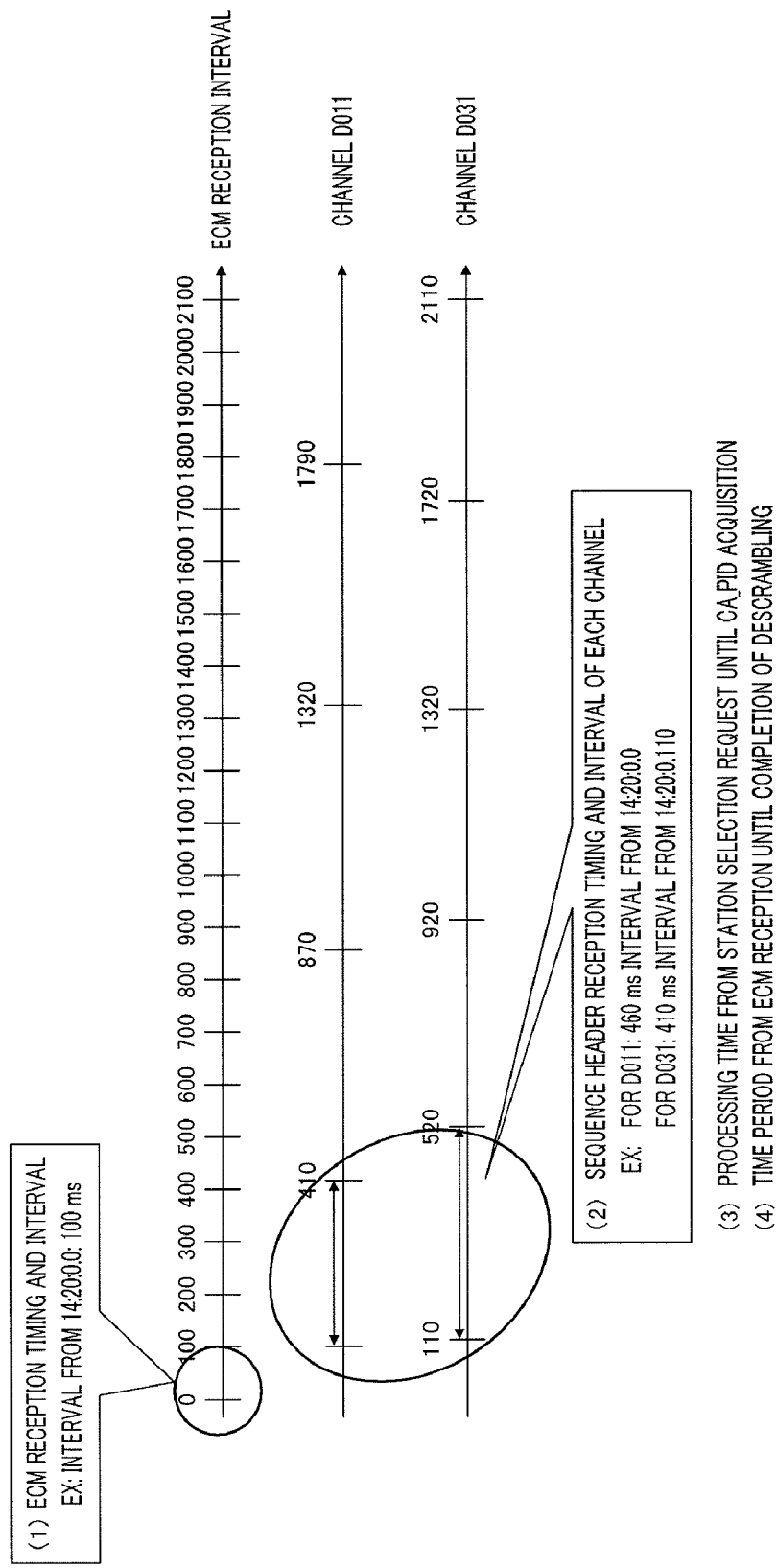
FIG. 13 is a drawing explaining the ECM reception timing and interval, and the sequence header reception timing and interval of each channel.

FIG. 13 is a drawing explaining the ECM reception timing and interval, and the sequence header reception timing and interval of each channel. In the drawing, horizontal axes indicate ECM reception intervals.

In the example shown in FIG. 13, (1) the ECM reception timing and interval are, for example, an interval of 100 ms from 14:20:0.0.

Also, (2) the sequence header reception timing and interval of each channel are, for example, an interval of 460 ms from 14:20:0.0 in the case of D011 and an interval of 410 ms from 14:20:0.110 in the case of D031.

Although not shown in the drawing, other time periods necessary as control parameters are (3) processing time from a station selection request until CA_PID acquisition, and (4) a time period from ECM reception until completion of descrambling.

(Embodiment 1)

Figure 14:
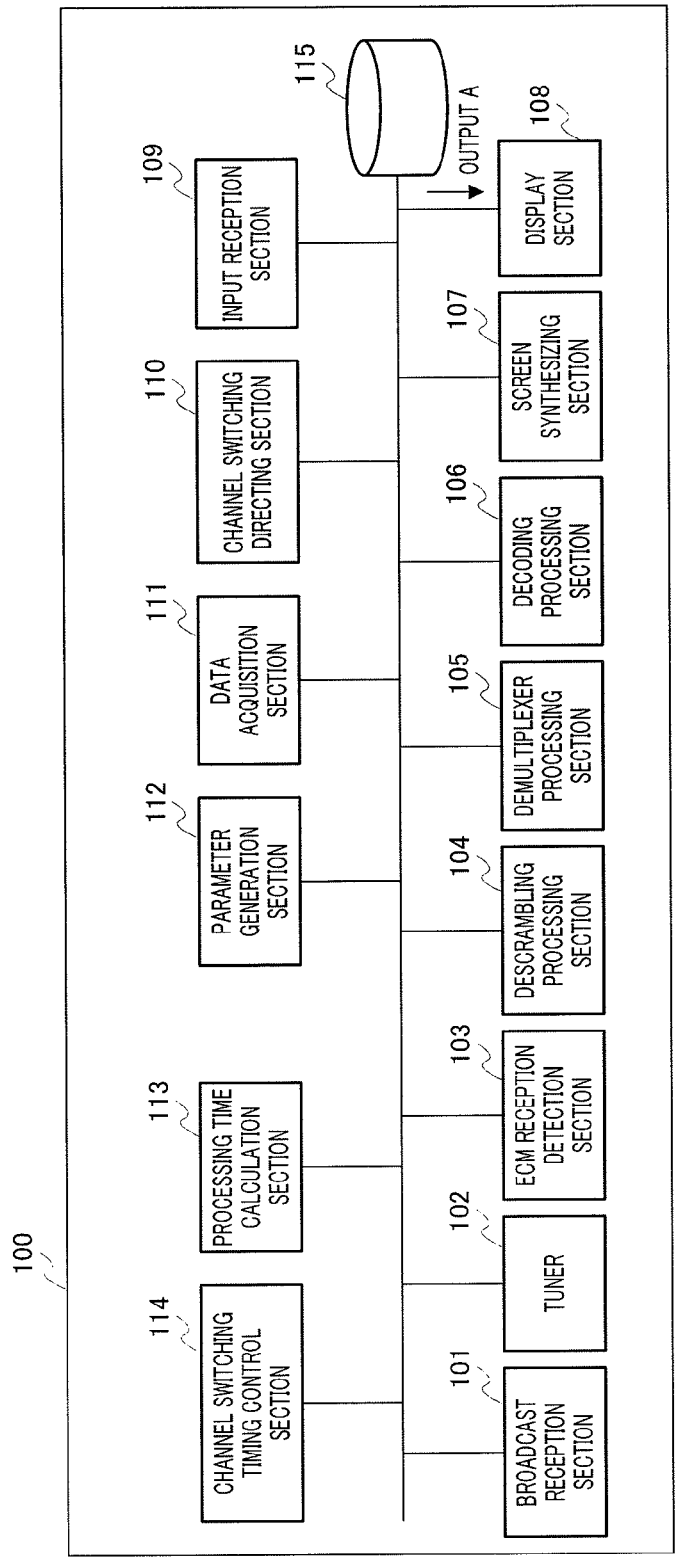
FIG. 14 is a function block diagram showing the configuration of a digital broadcast reception apparatus according to Embodiment 1 of the present invention.

FIG. 14 is a function block diagram showing the configuration of a digital broadcast reception apparatus according to Embodiment 1 of the present invention based on the above-described basic concept.

As shown in FIG. 14, digital broadcast reception apparatus 100 comprises broadcast reception section 101, tuner 102, ECM reception detection section 103, descrambling processing section 104, demultiplexer processing section 105, decoding processing section 106, screen synthesizing section 107, display section 108, input reception section 109, channel switching directing section 110, data acquisition section 111, parameter generation section 112, processing time calculation section 113, channel switching timing control section 114, and storage section 115.

Sections such as broadcast reception section 101, tuner 102, ECM reception detection section 103, descrambling processing section 104, demultiplexer processing section 105, decoding processing section 106, screen synthesizing section 107, display section 108, input reception section 109, channel switching directing section 110, data acquisition section 111, parameter generation section 112, processing time calculation section 113, channel switching timing control section 114, and storage section 115 are configured by means of LSI (Large Scale Integration), typically comprising integrated circuitry.

These sections may be implemented individually as single chips, or a single chip may incorporate some or all of them. Here, the term LSI has been used, but the terms IC, system LSI, super LSI, and ultra LSI may also be used according to differences in the degree of integration. The method of implementing integrated circuitry is not limited to LSI, and implementation by means of dedicated circuitry or a general-purpose processor may also be used. An FPGA (Field Programmable Gate Array) for which programming is possible after LSI fabrication, or a reconfigurable processor allowing reconfiguration of circuit cell connections and settings within an LSI, may also be used. Furthermore, integration of the sections may also be performed by means of an integrated circuit implementation technology whereby LSI is replaced by a different technology as an advance in, or derivation from, semiconductor technology. For example, integration may also be performed by applying biotechnology.

Broadcast reception section 101 receives a signal transmitted from a broadcasting station, and outputs the received signal to tuner 102.

Tuner 102 selects a target carrier from a received signal input from broadcast reception section 101, based on a channel number input from channel switching directing section 110 described later herein, and performs demodulation processing. It is possible to extract a signal (TS packet: Transport Stream packet) of a channel that is selected by means of this processing.

The structure of a TS packet is shown in FIG. 2 referred to above. As shown in FIG. 2, the header of a TS packet includes a PID (Packet ID) indicating the type of payload. By referencing this PID, it is possible to identify whether a TS packet sent from a broadcasting station is program identification information (PAT, PMT), or is Service Information (SI: program title, program contents, program broadcast time), or is video data or audio data.

ECM reception detection processing section 103 monitors header information (to be precise, a PID included in the header) of a TS packet input from tuner 102, based on ECM_PID information set by descrambling processing section 104, and on determining this to be an ECM, reports the received ECM to descrambling processing section 104.

Descrambling processing section 104 generates an encryption key using the ECM reported by ECM reception detection processing section 103, and then performs descrambling processing using that encryption key, and performs processing that clears encryption of the received signal. Descrambling processing section 104 outputs a signal generated by performing encryption clearing processing to demultiplexer processing section 105.

Demultiplexer processing section 105 performs separation processing on a signal input from descrambling processing section 104. In order to perform individual output to a later-stage function that processes service information and individual audio and video data, demultiplexer processing section 105 performs processing that references the PID of an input TS packet, determines whether that TS packet is service information or is audio and video data, and performs separation.

Service information separated by demultiplexer processing section 105 is output to storage section 115. Video and audio data separated by demultiplexer processing section 105 is output to decoding processing section 106.

Figure 15:
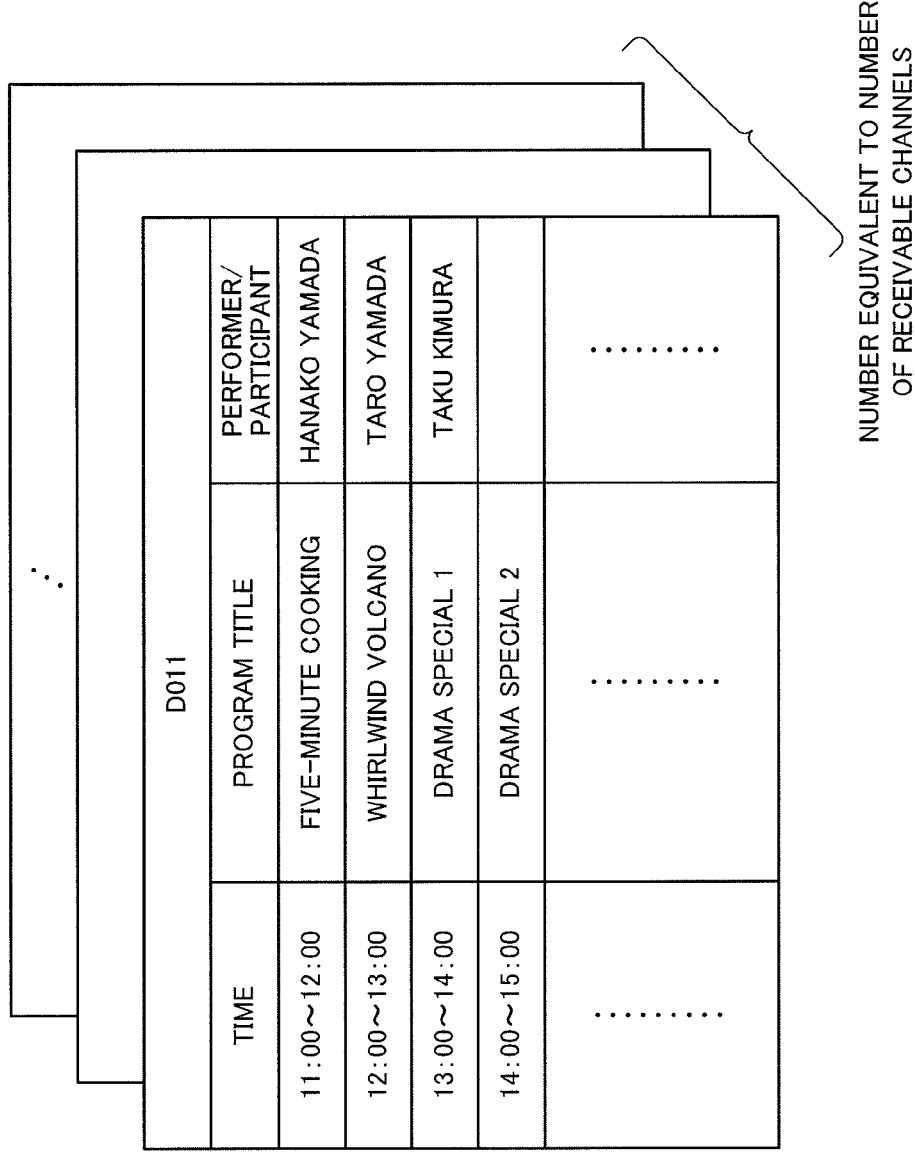
FIG. 15 is a drawing showing an example of service information present in a storage section of a digital broadcast reception apparatus according to above Embodiment 1.

FIG. 15 is a drawing showing an example of service information stored in storage section 115.

As shown in FIG. 15, service information includes a program schedule of each channel (channel number, program broadcast time, program title, performer/participant, and so forth), and exists for each receivable channel. This service information is used by an electronic program guide (EPG).

Decoding processing section 106 performs decoding processing of audio/video data output from demultiplexer processing section 105. Video data that has undergone decoding processing by decoding processing section 106 is output to screen synthesizing section 107 described later herein. On detecting a sequence header, decoding processing section 106 notifies data acquisition section 111.

Screen synthesizing section 107 combines video data input from decoding processing section 106 and still image or suchlike data stored in storage section 115 described later herein. Screen synthesizing section 107 outputs combined data to display section 108.

Display section 108 sends video input from screen synthesizing section 107 to a monitor or suchlike output device, and displays the sent video.

On detecting a zapping request signal from an external control device such as a remote control, input reception section 109 references the service information shown in FIG. 15, generates an automatic zapping request that includes channel numbers of all channels acquired from the referenced service information, and outputs this to channel switching timing control section 114.

Channel switching directing section 110 issues a processing time acquisition request to data acquisition section 111. A processing time acquisition request may be issued at the time of system startup, or may be issued periodically by channel switching directing section 110. This processing time acquisition request is issued when a channel switching request is input to channel switching directing section 110, and when an ECM_PID is acquired by channel switching directing section 110.

Channel switching directing section 110 issues a front-end processing (selected channel frequency synchronization processing) start request to tuner 102. When front-end processing ends, channel switching directing section 110 performs program identification information acquisition processing. Since an ECM_PID (used for ECM reception processing) is included in a TS packet in which program identification information is stored, ECM_PID acquisition processing is also performed at the same time. When ECM_PID acquisition processing ends, a processing time acquisition request is issued to data acquisition section 111.

Channel switching directing section 110 outputs a descrambling request including ECM_PID information to descrambling processing section 104, and when descrambling processing is completed, issues a decoding start request to decoding processing section 106.

When a processing time acquisition request is input from digital broadcast reception apparatus 100, data acquisition section 111 performs acquisition processing of that time. Possible time acquisition methods include use of an API (Application Program Interface) for acquiring system time, directly referencing a timer register, and so forth. There are no particular restrictions on the acquisition method. Data acquisition section 111 uses the acquired time to calculate the time period from the start of front-end processing until ECM_PID acquisition.

When an ECM reception timing acquisition request is input from descrambling processing section 104, data acquisition section 111 acquires the time at that time. Also, when a second ECM reception timing acquisition request is input, data acquisition section 111 acquires the time in the same way. Data acquisition section 111 calculates the ECM reception interval from first ECM reception time (1) and second ECM reception time (2). In order to record the reception time of the ECM received first and the ECM reception interval as control parameters, data acquisition section 111 outputs a parameter recording request that includes the ECM reception time and ECM reception interval to parameter generation section 112. Then, when a descrambling processing completion notification is input from descrambling processing section 104, data acquisition section 111 acquires the time at that time. Data acquisition section 111 calculates the time period from ECM reception until completion of descrambling processing from above ECM reception time (1) and the descrambling processing completion time, and outputs a parameter recording request that includes that value to parameter generation section 112.

When notified of the completion of sequence header reception by decoding processing section 106, data acquisition section 111 acquires the time at the time of the notification. Also, when notified of a second sequence header reception completion, data acquisition section 111 acquires the time in the same way. Data acquisition section 111 calculates the sequence header reception interval from the time of the first sequence header reception completion notification and the time of the second reception completion notification. In order to record the reception time of the sequence header received first and the sequence header reception interval as control parameters, data acquisition section 111 outputs a parameter recording request that includes the sequence header reception time and sequence header reception interval to parameter generation section 112.

When a parameter recording request is input from data acquisition section 111, parameter generation section 112 records data for which there is a recording request (for example, an ECM reception time and ECM reception interval) in storage section 115 as control parameters. Examples of control parameters are shown in FIG. 16.

FIG.'s. 16A through 16C are drawings showing examples of control parameters necessary for controlling front-end processing start timing. FIG. 16A shows time necessary for channel switching processing, FIG. 16B shows information relating to ECM reception processing, and FIG. 16C shows information relating to sequence header reception processing of each channel.

As shown in FIG. 16A, time necessary for channel switching processing comprises X: a time period from the start of front-end processing until ECM_PID acquisition, and Y: a time period from ECM reception until completion of descrambling.

As shown in FIG. 16B, information relating to ECM reception processing comprises a time at which an ECM is received (taken as a reference time) and an ECM reception interval.

As shown in FIG. 16C, information relating to sequence header reception processing of each channel comprises a sequence header reception time (taken as a reference time) and sequence header interval of each channel. Here, a reference time denotes a time of first reception after acquisition processing is started for ECM or sequence header data.

Based on control parameters generated by parameter generation section 112, processing time calculation section 113 calculates channel switching time—that is, a period of time necessary for channel switching obtained by subtracting a channel switching occurrence time from a channel switching completion time.

Processing time calculation section 113 calculates channel switching time when channel switching start timing is controlled so that an ECM reception wait time and sequence header reception wait time are shortened, using the control parameters shown in FIG.'s. 16A through 16C.

Processing time calculation section 113 calculates channel switching times for two channel switching start timing patterns: channel switching times T1 (channel switching time when channel switching start timing is controlled based on an ECM reception wait time) and T2 (channel switching time when the timing at which channel switching is started is controlled based on a sequence header reception wait time).

Channel switching timing control section 114 controls channel switching start timing so that a data reception wait time that occurs at the time of channel switching is shortened, based on a channel switching time calculated by processing time calculation section 113.

When an automatic zapping request for all channels is input from input reception section 109, channel switching timing control section 114 outputs a channel switching time calculation request that includes a channel number to processing time calculation section 113.

FIG. 17 is a drawing showing channel switching start timing (a time at which channel switching is started), and a channel switching time at that time. FIG. 18 is a drawing showing a sequence header reception time.

When a channel switching time calculation processing completion notification is input from processing time calculation section 113, channel switching timing control section 114 performs processing that acquires data from the channel switching time management table in FIG. 17 that is recorded in storage section 115, and determines and selects optimal channel switching timing.

Storage section 115 stores the following data.

a. Storage section 115 stores service information output by demultiplexer processing section 105 (see the service information in FIG. 15).

b. Storage section 115 stores control parameters generated by parameter generation section 112. Specifically, these are the ECM_PID acquisition time from front-end processing and the time period from ECM reception until completion of descrambling in FIG. 16A, the ECM reception time and ECM reception interval in FIG. 16B, and the sequence header reception time and sequence header reception interval of each channel in FIG. 16C.

c. Storage section 115 stores a channel switching time management table containing channel switching start timing input by channel switching timing control section 114 and a channel switching time input by processing time calculation section 113 (see FIG. 17).

d. Storage section 115 stores a sequence header reception time entered in "sequence header reception time" input by processing time calculation section 113 (see FIG. 18).

The operation of digital broadcast reception apparatus 100 configured as described above will now be explained.

First, an optimal channel switching start timing control flow of digital broadcast reception apparatus 100 will be described.

Figure 19:
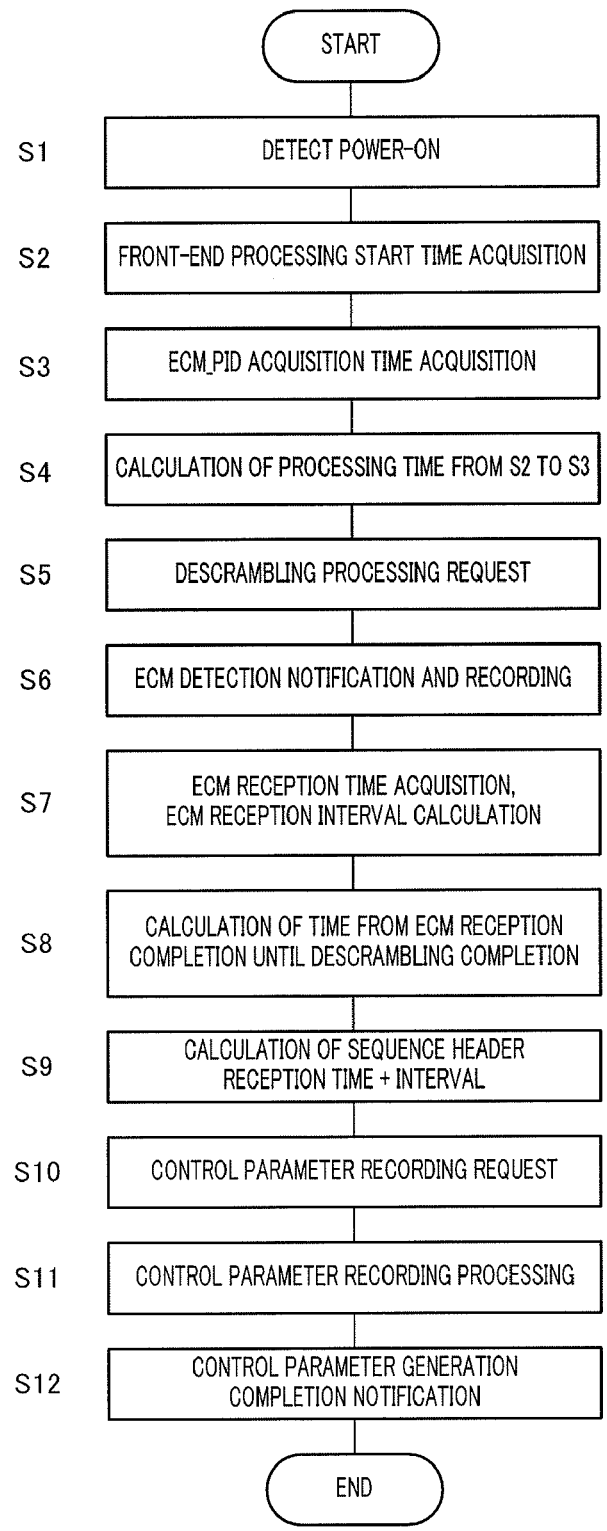
FIG. 19 is a flowchart for explaining an optimal channel switching start timing control method executed by a digital broadcast reception apparatus according to above Embodiment 1.
Figure 20:
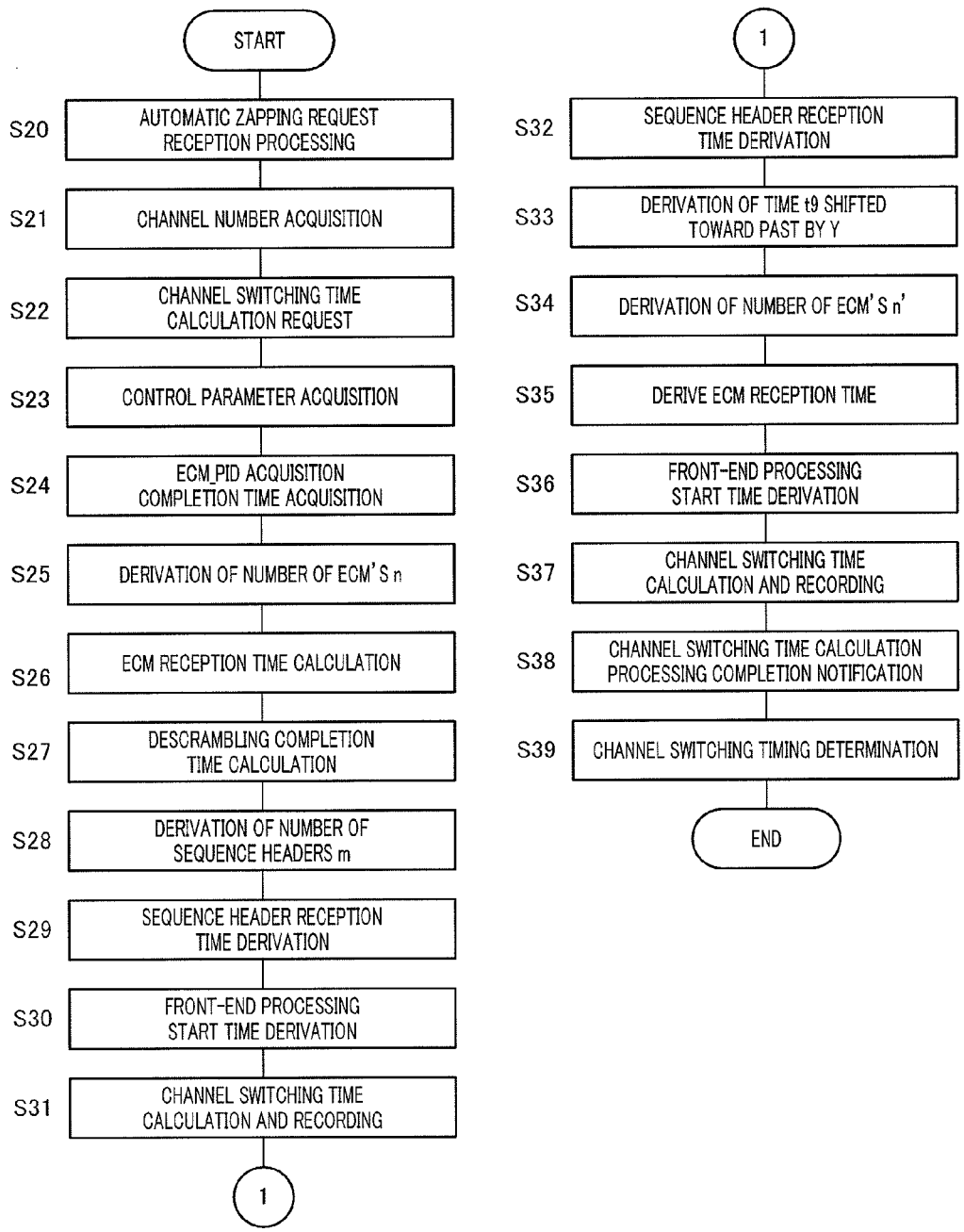
FIG. 20 is a flowchart for explaining an optimal channel switching start timing control method executed by a digital broadcast reception apparatus according to above Embodiment 1.

FIG. 19 and FIG. 20 are flowcharts for explaining an optimal channel switching start timing control method executed by digital broadcast reception apparatus 100. In these flowcharts, "S" indicates a step of the process.

FIG. 19 is a flowchart showing a control parameter acquisition method for calculating parameters necessary for deciding optimal channel switching start timing. FIG. 20 is a flowchart showing a channel switching start timing control method that uses control parameters.

Digital broadcast reception apparatus 100 acquires control parameters by performing steps S1 through S12 shown in FIG. 19, and decides channel switching start timing using control parameters by performing steps S20 through S39 shown in FIG. 20.

The control parameter acquisition method used by digital broadcast reception apparatus 100 will now be described with reference to the flowchart in FIG. 19.

In step S1, on detecting that power has been turned on, channel switching directing section 110 references service information stored in storage section 115 (see FIG. 15), and acquires a receivable channel number.

In step S2, channel switching directing section 110 issues a processing time acquisition request to data acquisition section 111 based on the acquired channel number information, and acquires the time at the time of the start of front-end processing.

In step S3, channel switching directing section 110 performs front-end processing, program identification information acquisition processing, and ECM_PID acquisition processing. Immediately after ECM_PID acquisition processing, channel switching directing section 110 issues a processing time acquisition request to data acquisition section 111 and acquires the time at the time of ECM_PID acquisition.

In step S4, data acquisition section 111 uses the times acquired in step S2 and step S3 to calculate a time period from the start of front-end processing until ECM_PID acquisition.

In step S5, after ECM_PID acquisition, channel switching directing section 110 outputs a descrambling processing request including an ECM_PID to descrambling processing section 104.

In step S6, when a descrambling setting request is input, descrambling processing section 104 sets an ECM_PID for ECM reception detection section 103, and performs an ECM reception timing notification procedure. By means of this procedure, ECM reception timing notification is given to descrambling processing section 104 by ECM reception detection section 103 each time an ECM is detected.

In step S7, data acquisition section 111 records the time of a first ECM reception completion notification by descrambling processing section 104, and derives an ECM reception interval from that recorded time and the time of a second ECM reception completion notification by descrambling processing section 104.

In step S8, when a descrambling processing completion notification is input from descrambling processing section 104, data acquisition section 111 calculates a time period from ECM reception completion until descrambling completion using the first ECM reception time.

In step S9, data acquisition section 111 calculates a sequence header interval from a first sequence header detection notification (a sequence header detection notification detected first after channel switching occurs) input from decoding processing section 106, and a sequence header detection notification given second.

In step S10, data acquisition section 111 issues a parameter recording request that includes the data derived in above steps S4, S7, S8, and S9 to parameter generation section 112.

In step S11, when a parameter recording request including a time period from the start of front-end processing until ECM_PID acquisition and a time period from ECM reception until completion of descrambling processing, an ECM reception time and ECM reception interval, and a sequence header reception time and sequence header reception interval, is input from data acquisition section 111, parameter generation section 112 performs processing that records data for which there is a recording request in storage section 115 as the control parameters in FIG. 16. Specifically, a time period from the start of front-end processing until ECM_PID acquisition and a time period from ECM reception until completion of descrambling processing are recorded in control parameters (FIG. 16A), an ECM reception time and ECM reception interval are recorded in control parameters (FIG. 16B), and a sequence header reception time and sequence header reception interval are recorded in control parameters (FIG. 16C). When recording is completed, parameter generation section 112 outputs a recording completion notification to channel switching directing section 110.

In step S12, when a recording completion notification is input from parameter generation section 112, channel switching directing section 110 outputs a control parameter generation completion notification to data acquisition section 111. Channel switching directing section 110 performs the above processing for each channel.

Control parameter acquisition is executed before an actual channel switch or zapping request. For example, control parameter acquisition may be executed immediately after power is turned on, as in this embodiment.

A channel switching start timing decision method using control parameters will now be described with reference to FIG. 20 and FIG. 21.

Figure 21A:
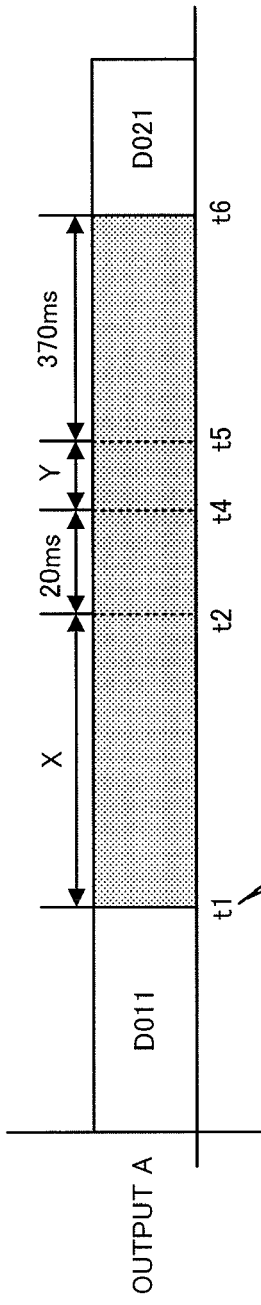
FIG. 21 comprises timing charts showing examples of channel switching processing of a digital broadcast reception apparatus according to above Embodiment 1.
Figure 21B:
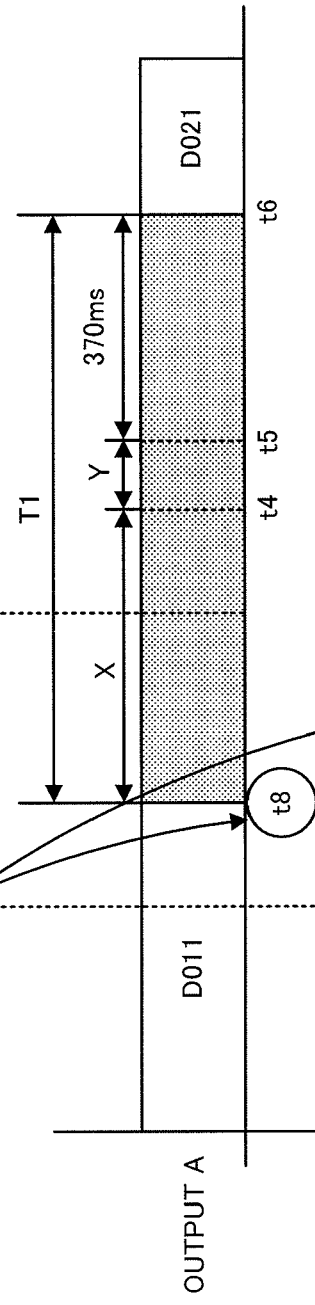
Figure 21C:
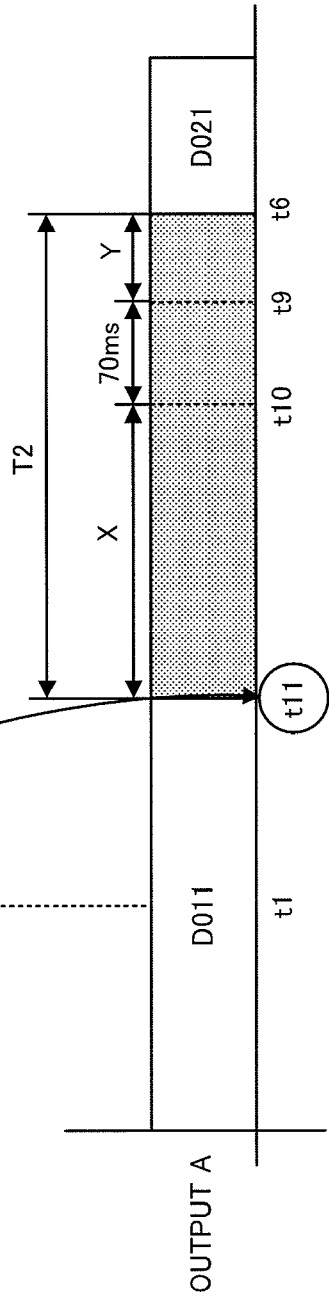

FIG. 21 comprises timing charts showing examples of channel switching processing. FIG. 21A shows a timing chart for a case in which normal channel switching is performed, FIG. 21B shows a timing chart for a case in which channel switching start timing is controlled based on ECM reception timing, and FIG. 21C shows a timing chart for a case in which channel switching start timing is controlled based on sequence header reception timing.

In the flowchart in FIG. 20, in step S20, on detecting a zapping request signal (a signal generated when a zapping button for automatically zapping all channels is pressed) from an external control device such as a remote control, input reception section 109 references the service information shown in FIG. 15, generates an automatic zapping request that includes the channel numbers of all channels acquired from the referenced service information, and outputs this to channel switching timing control section 114.

An automatic zapping request is an instruction for performing zapping at certain fixed intervals for all channels for which acquisition is possible from service information (see FIG. 15). There are no particular restrictions on a signal detected by input reception section 109, which may be a normal station selection signal or the like as well as a zapping request signal. When a normal station selection signal is detected, an automatic zapping request that includes a specified channel number is generated from service information.

In step S21, when an automatic zapping request is input from input reception section 109, channel switching timing control section 114 performs processing that reads all channel numbers from service information stored in storage section 115. There are no particular restrictions on order combinations in which station selection processing is performed, but in the following description it is assumed that the currently selected channel number is D011, and that station selection processing is performed in the following order: D011→D021→D031→D041→D051→D061→D071.

In step S22, channel switching timing control section 114 outputs a channel switching time calculation request that includes the next channel number to be selected (D021) to processing time calculation section 113. The time at this time is assumed to be t1 (here, 14:25:0:0 ⇒ 14 hrs 25 min 0.0 sec).

When a channel switching time calculation request that includes a channel number (D021) is input from channel switching timing control section 114, processing time calculation section 113 calculates two channel switching times: channel switching time T1 (channel switching time when channel switching start timing is controlled based on an ECM reception wait time) and T2 (channel switching time when the timing at which channel switching is started is controlled based on a sequence header reception wait time).

First, the T1 calculation method will be described.

In step S23, processing time calculation section 113 first acquires from storage section 115 data of a channel number specified by a channel switching request from the control parameters in FIG. 16 stored in storage section 115. Specifically, processing time calculation section 113 acquires channel D021 sequence header related data (reference time 14:20:25:0, sequence header interval 500 ms), X: 600 ms, Y: 10 ms, and ECM related data (reference time 14:20:15:0, ECM reception interval 100 ms).

In step S24, processing time calculation section 113 secondly calculates ECM_PID acquisition completion time t2 (step S24). This time is derived by means of equation 1 below.

$$t2 = t1 + X \quad \text{(Equation 1)}$$

In this case, the value of t2 is 14:25:0:600.

In step S25, processing time calculation section 113 thirdly performs ECM reception time calculation. From control parameters acquired from storage section 115, it can be seen that an ECM is sent in a 100 ms unit from time t3 (14:20:15:20). Processing time calculation section 113 derives the smallest integer n that satisfies the condition below from this t3. This number n indicates the ordinal number of an ECM, counting from time t3, that can be received, and is derived from conditional expression 2 below.

$$t2 - (t3 + n \times 100) < 0 \quad \text{(Equation 2)}$$

In this case, the value of n according to above equation 2 is 28550.

In step S26, processing time calculation section 113 uses this n to derive nearest ECM reception time t4 after ECM_PID acquisition. The derivation equation is as shown below.

$$t4 = t3 + n \times 100 \quad \text{(Equation 3)}$$

The actual value of t4 is 14:25:0:620. That is to say, there is a 20 ms wait time until ECM reception after X processing ends.

In step S27, processing time calculation section 113 fourthly derives time t5 (descrambling completion time) that is Y (10 ms) after the time of ECM reception. In this case, time t5 is derived from following equation 4, and is 14:25:0:630.

$$t5 = t4 + Y \quad \text{(Equation 4)}$$

In step S28, processing time calculation section 113 finds nearest sequence header reception time t6 after ECM reception. The smallest integer m that satisfies the condition below is derived from the fact that a sequence header is sent in a 500 ms unit from time t7, 14:20:25:0. This number m indicates the ordinal number of a sequence header, from time t7, that can be received, and is derived from conditional expression 5 below.

$$t5 - (t7 + m \times 500) < 0 \quad \text{(Equation 5)}$$

In this case, the value of m according to the above equation is 552.

In step S29, processing time calculation section 113 uses this m to derive nearest sequence header reception time t6 after ECM reception. The derivation equation is as shown below.

$$t6 = t7 + m \times 500 \quad \text{(Equation 6)}$$

The actual value of t6 is 14:25:1:0. That is to say, sequence header reception is possible after the occurrence of a 370 msec sequence header reception wait following the end of Y processing. This sequence header reception wait time is derived by means of equation 7 below.

$$\text{Sequence header reception wait time} = t6 - t5 \quad \text{(Equation 7)}$$

Here, time t6 is recorded in storage section 115 as a sequence header reception time. An actual example of recorded contents is shown in "sequence header reception time" in FIG. 18.

In step S30, processing time calculation section 113 fifthly calculates front-end processing start time t8 capable of shortening the 20 ms ECM reception wait time. Since the ECM reception time is 14:25:0:620, as explained above, this is time t8 found by the timing for ending X processing at this reception time. Thus, the equation for deriving t8 is as shown below.

$$t8 = t4 - X \quad \text{(Equation 8)}$$

In this case, the value of t8 is 14:25:0:20.

From the above calculation, when front-end processing is started immediately after a channel switching request is input from channel switching timing control section 114, channel switching time T1 (t6−t8) is 980 ms.

In step S31, processing time calculation section 113 records a derived channel switching time in the channel switching time management table in FIG. 17. Channel switching times (see FIG. 17) are managed by storage section 115, and indicate channel switching times with respect to channel switching start timings of respective channels. Time T1 is a channel switching time when a channel switching start time is 14 hrs 25 min 0.20 sec, and is therefore recorded in a form corresponding thereto.

In this case, the range of time T1 is as shown in FIG. 21B.

Channel switching start time 14:25:0:20 is also recorded by channel switching timing control section 114.

Next, a description will be given of a channel switching time T2 derivation method when front-end processing start timing is controlled so that an ECM wait time and sequence header wait time are shortened.

In step S32, when channel switching processing is first performed by means of the above-described normal sequence from the current time, processing time calculation section 113 derives a sequence header reception time enabling fastest reception. This time can be acquired by reading a sequence header reception time recorded at the time of T1 calculation (see FIG. 18) from storage section 115. In this case, the time is 14:25:1:0.

In step S33, processing time calculation section 113 secondly derives the time of time t9 (14:25:0:990) shifted toward the past by control parameter time Y in FIG. 16A from this time. As is also clear from FIG. 21C, a time is derived that results from moving back into the past by Y from a time at which a sequence header is received.

In step S34, processing time calculation section 113 thirdly calculates ECM reception time t10 nearest time t9. From the fact that an ECM is sent in a 100 ms unit from time t3, as stated above, the ordinal number from time t9 of the nearest ECM is derived from conditional expression 9 below, where n' denotes a term for which the smallest value that satisfies the following conditional expression is derived.

$$t9 - (t3 + n' \times 100) < 100 \quad \text{(Equation 9)}$$

In this case, the derived value of n' is 2859.

In step S35, processing time calculation section 113 uses n' derived from above conditional expression 9 to derive nearest ECM reception time t10 after time t9 from following equation 10.

$$t10 = t3 + n' \times 100 \quad \text{(Equation 10)}$$

In this case, the value of t10 is 14:25:0:920.

In step S36, processing time calculation section 113 fourthly derives time t11 shifted toward the past by control parameter time X from time t10. In this case, since X is 600, the value of t11 is given as 14:25:0:320 by following equation 11.

$$t11 = t10 - X \quad \text{(Equation 11)}$$

FIG. 21C shows a timing chart for a case in which a shift is performed toward the past by time X from time t10. This time t11 is the time of channel switching start timing calculated so as to shorten a time period combining an ECM reception wait time and a sequence header wait time.

In step S37, processing time calculation section 113 records t11 in the channel switching time management table in FIG. 17.

Channel switching time T2 for this channel start timing is derived from following equation 12.

$$T2 = X + (t9 - t10) + Y \quad \text{(Equation 12)}$$

In this case, the value of T2 is 680 ms. The range of time T2 is shown in FIG. 21C.

In step S37, processing time calculation section 113 records time T2 derived as described above in the channel switching time management table shown in FIG. 17.

In step S38, when calculation of T1 and T2 ends as described above, processing time calculation section 113 outputs a channel switching time calculation processing completion notification to channel switching timing control section 114.

In step S39, when a channel switching time calculation processing completion notification is input from processing time calculation section 113, channel switching timing control section 114 performs processing that acquires data from the channel switching time management table in FIG. 17 that is recorded in storage section 115, and determines and selects optimal channel switching timing. In this case, the timing of time t11 (14 hrs 25 min 0.320 sec) for which the channel switching time is shortest is the optimal time. Channel switching timing control section 114 issues a front-end processing start request after time t11 is reached.

Steps S22 through S39 above are performed in line with a channel that is changed at each channel switching timing, and optimal channel switching start timing is constantly controlled.

By following the above-described procedure, it is possible for processing that normally takes time (X+20 ms+Y+370 ms) shown in FIG. 21A until output A is provided to display section 108 to provide output A at time T2 in FIG. 21C at which the channel switching time becomes minimal.

As described in detail above, according to this embodiment, digital broadcast reception apparatus 100 is provided with data acquisition section 111 that measures data relating to a data reception wait that occurs in channel switching processing, channel switching directing section 110 that controls the timing of operation of data acquisition section 111, parameter generation section 112 that generates a control parameter based on data acquired by data acquisition section 111, processing time calculation section 113 that calculates a channel switching time based on a control parameter generated by parameter generation section 112, and channel switching timing control section 114 that controls channel switching start timing so that a data reception wait time that occurs at the time of channel switching is shortened, and controls front-end processing start timing so that an ECM reception wait time and sequence header reception wait time are minimized. By this means, channel switching start timing can be controlled so that a data wait time that occurs at the time of channel switching is shortened, and a time period during which display is not possible can be shortened.

In this embodiment, an example has been shown in which channel switching start timing is controlled so that a time period combining an ECM reception wait time and a sequence header reception wait time is minimized, but the present invention is not limited to this. For example, it is also possible to control channel switching start timing so that a PAT and PMT reception wait time, which is one of the data wait times at the time of channel switching, is also minimized.

In this case, it is necessary to decide a time at which a PAT and PMT are received, and control channel switching start timing, after deriving an expected sequence header reception time and expected ECM reception time.

(Embodiment 2)

Figure 22:
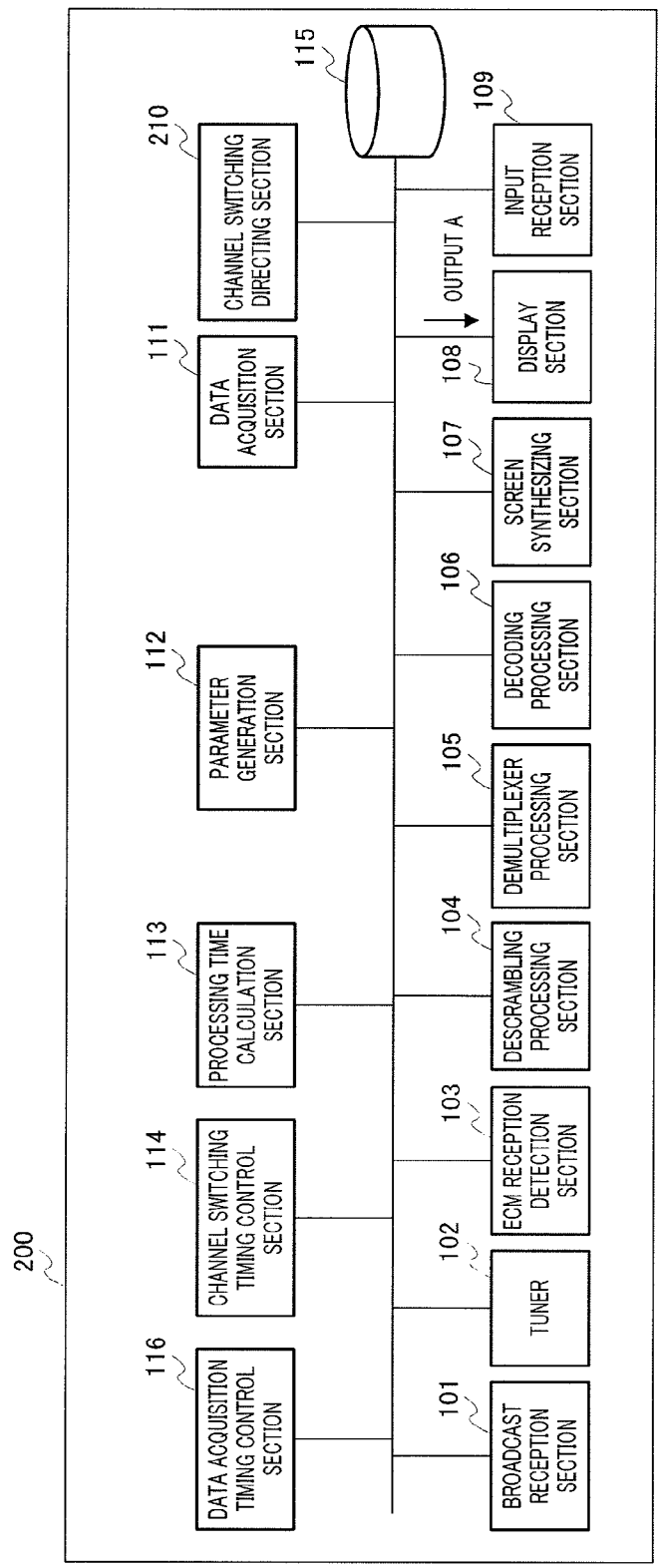
FIG. 22 is a function block diagram showing the configuration of a digital broadcast reception apparatus according to Embodiment 2 of the present invention.

FIG. 22 is a function block diagram showing the configuration of a digital broadcast reception apparatus according to Embodiment 2 of the present invention. Configuration parts in FIG. 22 identical to those in FIG. 14 are assigned the same reference codes as in FIG. 14, and duplicate descriptions are omitted here.

As shown in FIG. 22, digital broadcast reception apparatus 200 comprises broadcast reception section 101, tuner 102, ECM reception detection section 103, descrambling processing section 104, demultiplexer processing section 105, decoding processing section 106, screen synthesizing section 107, display section 108, input reception section 109, channel switching directing section 210, data acquisition section 111, parameter generation section 112, processing time calculation section 113, channel switching timing control section 114, storage section 115, and data acquisition timing control section 116.

Sections such as broadcast reception section 101, tuner 102, ECM reception detection section 103, descrambling processing section 104, demultiplexer processing section 105, decoding processing section 106, screen synthesizing section 107, display section 108, input reception section 109, channel switching directing section 210, data acquisition section 111, parameter generation section 112, processing time calculation section 113, channel switching timing control section 114, storage section 115, and data acquisition timing control section 116 are configured by means of LSI, typically comprising integrated circuitry.

These sections may be implemented individually as single chips, or a single chip may incorporate some or all of them. Here, the term LSI has been used, but the terms IC, system LSI, super LSI, and ultra LSI may also be used according to differences in the degree of integration. The method of implementing integrated circuitry is not limited to LSI, and implementation by means of dedicated circuitry or a general-purpose processor may also be used. An FPGA (Field Programmable Gate Array) for which programming is possible after LSI fabrication, or a reconfigurable processor allowing reconfiguration of circuit cell connections and settings within an LSI, may also be used. Furthermore, integration of the sections may also be performed by means of an integrated circuit implementation technology whereby LSI is replaced by a different technology as an advance in, or derivation from, semiconductor technology. For example, integration may also be performed by applying biotechnology.

When a control parameter generation request (an instruction for acquiring data necessary for controlling front-end processing start timing) is input from data acquisition timing control section 116 described later herein, channel switching directing section 210 issues a processing time acquisition request to data acquisition section 111.

This processing time acquisition request is issued immediately before front-end processing and after ECM_PID acquisition.

Specifically, channel switching directing section 210 issues a front-end processing (selected channel frequency synchronization processing) start request to tuner 102. When front-end processing ends, channel switching directing section 210 performs program identification information acquisition processing. Since an ECM_PID (used for ECM reception processing) is included in a TS packet in which program identification information is stored, ECM_PID acquisition processing is also performed at the same time. When ECM_PID acquisition processing ends, a processing time acquisition request is issued to data acquisition section 111 described later herein.

Channel switching directing section 210 issues a descrambling request including ECM_PID information to descrambling processing section 104, and when descrambling processing is completed, issues a decoding start request to decoding processing section 106. It is here assumed that, if a tuner ID (an ID identifying a tuner) is included in a control parameter generation request input from data acquisition timing control section 116, channel switching directing section 210 performs the above processing using the tuner identified by that tuner ID.

Figure 23:
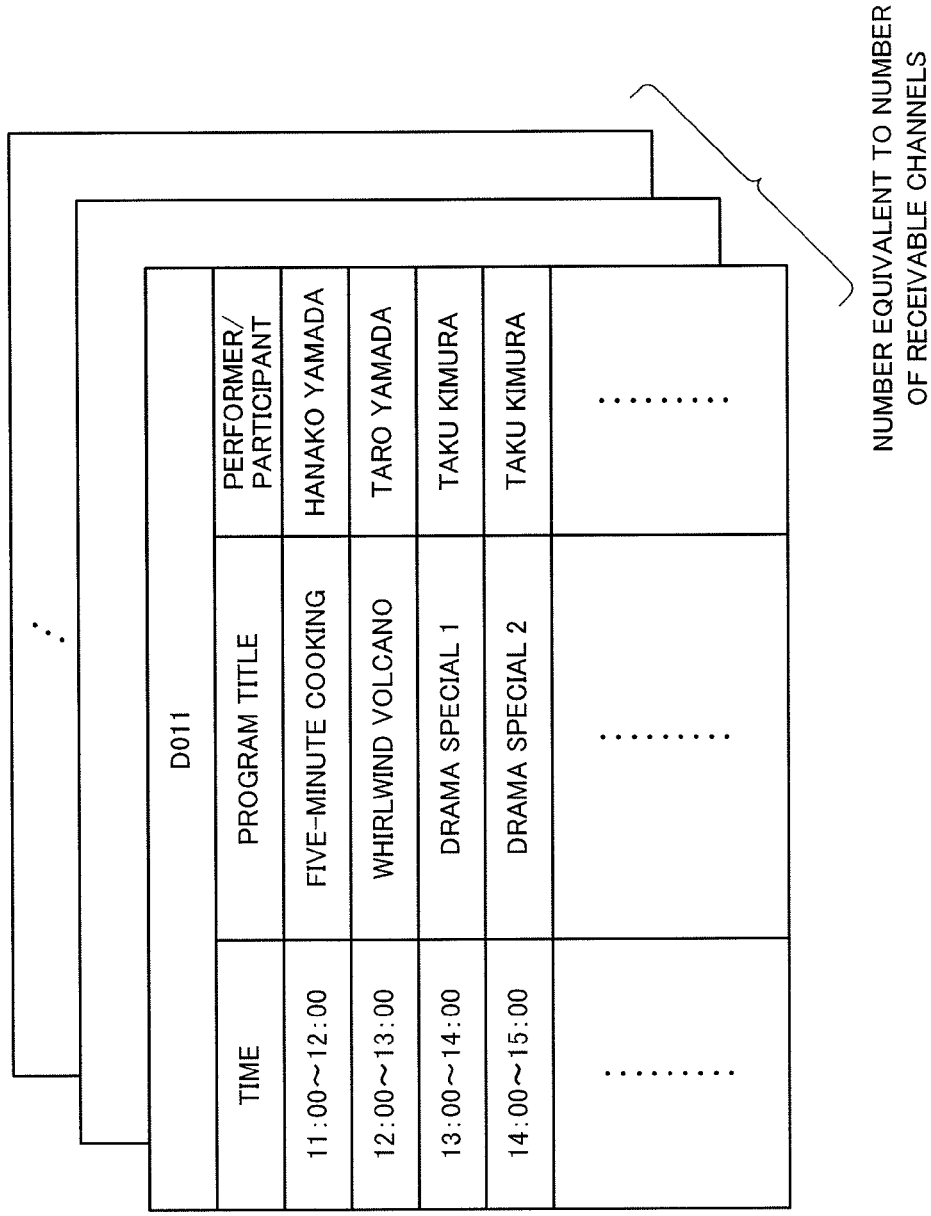
FIG. 23 is a drawing showing an example of service information that implements data broadcasting provided by a broadcasting station of a digital broadcast reception apparatus according to above Embodiment 2.
Figures 24, 25:
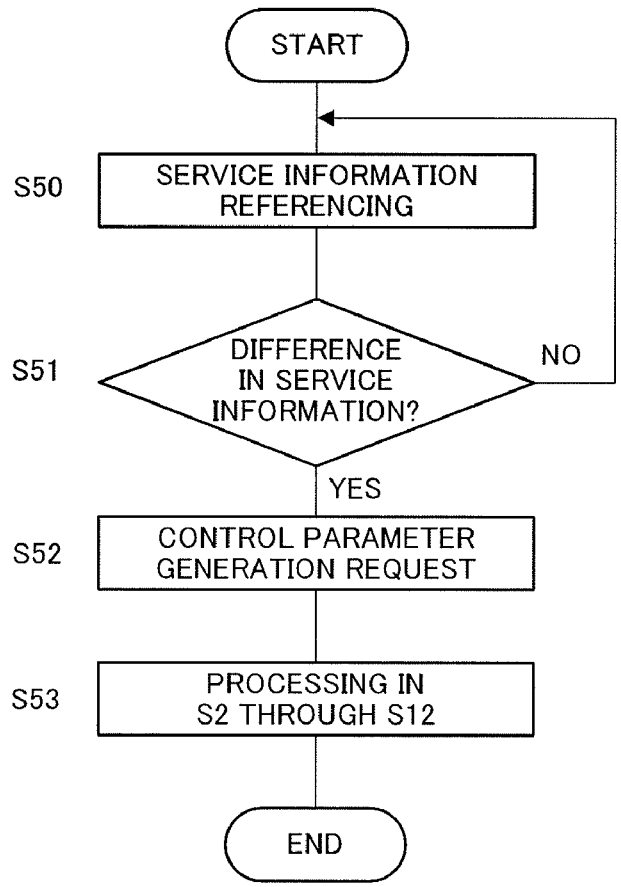
FIG. 24 is a drawing showing an example of a tuner ID management table of a broadcasting station of a digital broadcast reception apparatus according to above Embodiment 2.
FIG. 25 is a flowchart showing control parameter update processing executed by a digital broadcast reception apparatus according to above Embodiment 2.

FIG. 23 is a drawing showing an example of service information that implements data broadcasting provided by a broadcasting station, and FIG. 24 is a drawing showing an example of a tuner ID management table.

Data acquisition timing control section 116 references the service information shown in FIG. 23 periodically, and in the event of ascertaining that multiplex broadcasting has been started by the same broadcasting station (or when multiplex broadcasting ends and single-program broadcasting is returned to), issues a control parameter generation request to channel switching directing section 210 in order to update a control parameter of the broadcast channel number.

Also, data acquisition timing control section 116 references the utilization situation by means of the tuner ID management table shown in FIG. 24, and if there is a vacant tuner, issues a control parameter generation request that includes that tuner ID. In the case shown in FIG. 24, channel number D011 is assigned to tuner ID 1, and no channel is assigned to tuner ID 2.

The operation of digital broadcast reception apparatus 200 configured as described above will now be explained. The basic operation is similar to that of digital broadcast reception apparatus 100. In this embodiment, the control parameter updating flow will be described.

FIG. 25 is a flowchart showing control parameter update processing executed by digital broadcast reception apparatus 200.

Figure 27:
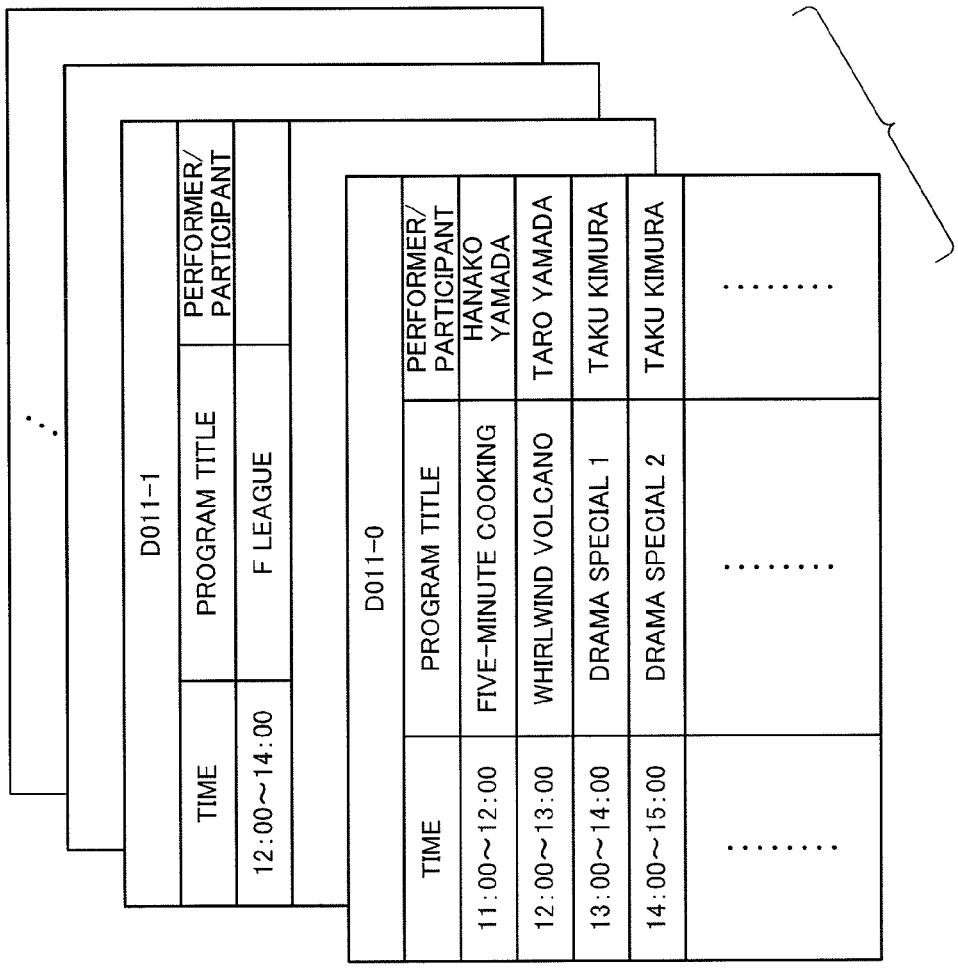
FIG. 27 is a drawing showing an example of service information that implements data broadcasting provided by a broadcasting station of a digital broadcast reception apparatus according to above Embodiment 2.

FIG.'s. 26A and 26B and FIG. 27 are drawings showing examples of service information that implements data broadcasting provided by a broadcasting station. FIG. 26A and FIG. 26B show that there is multiplex broadcasting comprising a plurality of programs by the same broadcasting station.

In step S50, data acquisition timing control section 116 performs processing that acquires the service information shown in FIG. 23 at certain timing. There are no particular restrictions on the acquisition timing, and acquisition may be performed periodically or may be performed at time intervals specified by the user.

In step S51, data acquisition timing control section 116 compares service information stored in the past with service information newly acquired in step S50 above, and performs determination processing as to whether or not it is necessary to generate a new control parameter. It will be assumed that service information acquired in the past is as shown in FIG. 23, and service information newly acquired in step S50 is as shown in FIG. 26B. In this step S51, processing is performed that determines whether multiplex broadcasting comprising a plurality of programs is started by the same broadcasting station, or whether there is a broadcasting station that terminates multiplex broadcasting, as in FIG.'s. 26A and 26B. If there is a difference in the service information, that information is updated to the service information shown in FIG. 23, the processing flow proceeds to step S52, whereas if there is no difference, the processing flow returns to step S50, and service information acquisition processing is performed. In this case, information to the effect that multiplex broadcasting was started from 12:00 on channel number D011 is newly included in the newly acquired service information (see FIG. 26B). Specifically, information to the effect that a program called "Whirlwind Volcano" and a program called "F League" are multiplex-broadcast from 12 o'clock is added.

In step S52, data acquisition timing control section 116 issues a control parameter generation request to channel switching directing section 210 in order to perform control parameter updating. Here, data acquisition timing control section 116 references the tuner utilization situation of the tuner ID management table shown in FIG. 24, and if there is a vacant tuner, issues a control parameter generation request that includes that tuner ID (requests control parameter generation using the vacant tuner).

In subsequent processing, the same kind of processing is performed as in step S2 through step S12 in FIG. 19, and control parameter generation is performed (step S53).

Thus, according to Embodiment 2, by periodically referencing service information and updating control parameters, digital broadcast reception apparatus 200 can perform channel switching control according to the number of channels when multiplex broadcasting is started or multiplex broadcasting is ended by a broadcasting station. Also, when there is a vacant tuner, control parameter updating is possible while performing normal viewing by performing control parameter updating using that channel.

(Embodiment 3)

Figure 28:
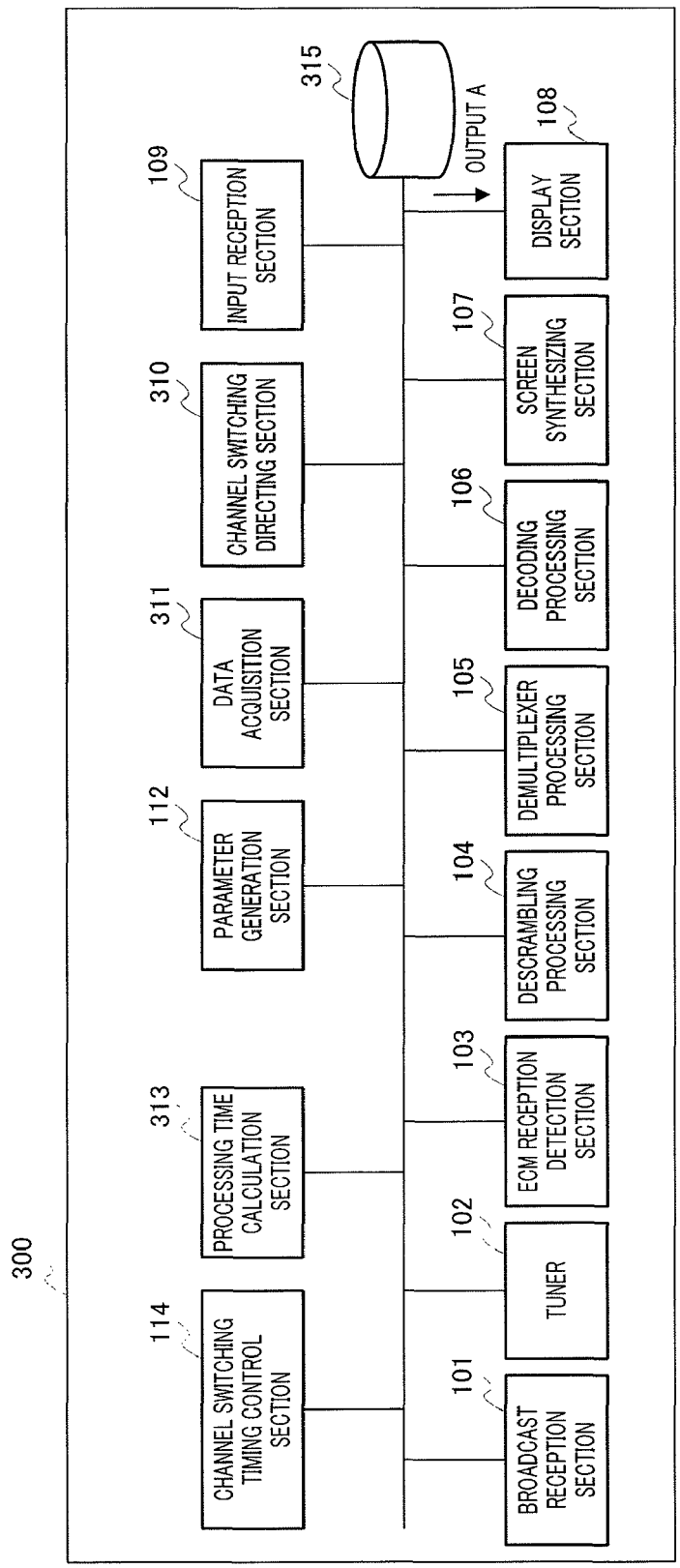
FIG. 28 is a function block diagram showing the configuration of a digital broadcast reception apparatus according to Embodiment 3 of the present invention.

FIG. 28 is a function block diagram showing the configuration of a digital broadcast reception apparatus according to Embodiment 3 of the present invention. Configuration parts in FIG. 28 identical to those in FIG. 14 are assigned the same reference codes as in FIG. 14, and duplicate descriptions are omitted here.

As shown in FIG. 28, digital broadcast reception apparatus 300 comprises broadcast reception section 101, tuner 102, ECM reception detection section 103, descrambling processing section 104, demultiplexer processing section 105, decoding processing section 106, screen synthesizing section 107, display section 108, input reception section 109, channel switching directing section 310, data acquisition section 311, parameter generation section 112, processing time calculation section 313, channel switching timing control section 114, and storage section 315.

Sections such as broadcast reception section 101, tuner 102, ECM reception detection section 103, descrambling processing section 104, demultiplexer processing section 105, decoding processing section 106, screen synthesizing section 107, display section 108, input reception section 109, channel switching directing section 310, data acquisition section 311, parameter generation section 112, processing time calculation section 313, channel switching timing control section 114, and storage section 315 are configured by means of LSI, typically comprising integrated circuitry.

These sections may be implemented individually as single chips, or a single chip may incorporate some or all of them. Here, the term LSI has been used, but the terms IC, system LSI, super LSI, and ultra LSI may also be used according to differences in the degree of integration. The method of implementing integrated circuitry is not limited to LSI, and implementation by means of dedicated circuitry or a general-purpose processor may also be used. An FPGA (Field Programmable Gate Array) for which programming is possible after LSI fabrication, or a reconfigurable processor allowing reconfiguration of circuit cell connections and settings within an LSI, may also be used. Furthermore, integration of the sections may also be performed by means of an integrated circuit implementation technology whereby LSI is replaced by a different technology as an advance in, or derivation from, semiconductor technology. For example, integration may also be performed by applying biotechnology.

Channel switching directing section 310 issues a processing time acquisition request to data acquisition section 311. A processing time acquisition request may be issued at the time of system startup, or may be issued periodically by channel switching directing section 310. This processing time acquisition request is issued when a channel switching request is input, and when an ECM_PID is acquired.

Figures 29, 30:
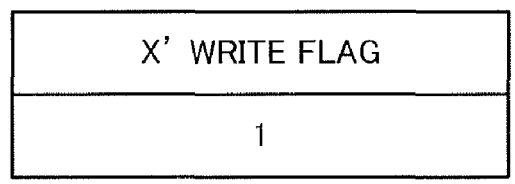
FIG. 29 is a drawing showing an example of a channel number/frequency correspondence table of a digital broadcast reception apparatus according to above Embodiment 3.
FIG. 30 is a drawing showing an example of an X' write flag of a digital broadcast reception apparatus according to above Embodiment 3.

FIG. 29 is a drawing showing an example of a channel number/frequency correspondence table, and FIG. 30 is a drawing showing an example of an X' write flag.

Channel switching directing section 310 performs processing that determines whether there is an item with the same frequency as the currently selected channel number. Specifically, channel switching directing section 310 determines whether the frequency is the same by comparing the frequency of the currently selected channel number with the frequency of a channel number scheduled to be selected next, based on a frequency correspondence table for all channel numbers acquired at the time of system setup or the like (see FIG. 29). In the case of identical frequencies, an X' write flag (see FIG. 30) is set.

Channel switching directing section 310 performs front-end processing (selected channel frequency synchronization processing) on tuner 102. If the write flag is set, front-end processing is skipped.

When front-end processing ends, channel switching directing section 310 performs program identification information acquisition processing. Since an ECM_PID (used for ECM reception processing) is included in a TS packet in which program identification information is stored, ECM_PID acquisition processing is also performed at the same time.

When ECM_PID acquisition processing ends, channel switching directing section 310 issues a processing time acquisition request to data acquisition section 311.

Channel switching directing section 310 outputs a descrambling request including ECM_PID information to descrambling processing section 104, and when descrambling processing is completed, issues a decoding start request to decoding processing section 106.

FIG.'s 31A through 31C are drawings showing examples of control parameters necessary for controlling front-end processing start timing. FIG. 31A shows time necessary for channel switching processing, FIG. 31B shows information relating to ECM reception processing, and FIG. 31C shows information relating to sequence header reception processing of each channel. These are similar to the drawings in FIG. 16.

Processing time calculation section 313 calculates channel switching time when channel switching start timing is controlled so that an ECM reception wait time and sequence header reception wait time are shortened, using the control parameters shown in FIG.'s 31A through 31C.

When reading data from control parameters (see FIG. 31A), if a channel number to be selected next has the same frequency, processing time calculation section 313 reads the value of X' as a time period from the start of front-end processing until ECM_PID acquisition. If the frequency is not the same, processing time calculation section 313 reads the value of X as a time period from the start of front-end processing until ECM_PID acquisition.

When a channel switching time calculation request that includes a channel number is input from channel switching timing control section 114, processing time calculation section 313 calculates channel switching times T1 and T2 for the following two channel switching start timing patterns. Channel switching time T1 is a channel switching time when channel switching start timing is controlled based on an ECM reception wait time, and channel switching time T2 is a channel switching time when the timing at which channel switching is started is controlled based on a sequence header reception wait time.

Storage section 315 stores the following data.

a. Service information output by demultiplexer processing section 105 (see the service information in FIG. 15)

b. Control parameters generated by parameter generation section 112. Specifically, these are the ECM_PID acquisition time from front-end processing and the time period from ECM reception until completion of descrambling in FIG. 31A, the ECM reception time and ECM reception interval in FIG. 31B, and the sequence header reception time and sequence header reception interval of each channel in FIG. 31C.

c. A channel switching time management table containing channel switching start timing input by channel switching timing control section 114 and a channel switching time input by processing time calculation section 313 (see FIG. 17)

d. A sequence header reception time entered in "sequence header reception time" input by processing time calculation section 313 (see FIG. 18)

e. A frequency correspondence table for all channel numbers acquired at the time of system setup or the like (see FIG. 29)

f. A write flag generated by channel switching directing section 310 (see FIG. 30)

The operation of digital broadcast reception apparatus 300 configured as described above will now be explained.

Figure 32:
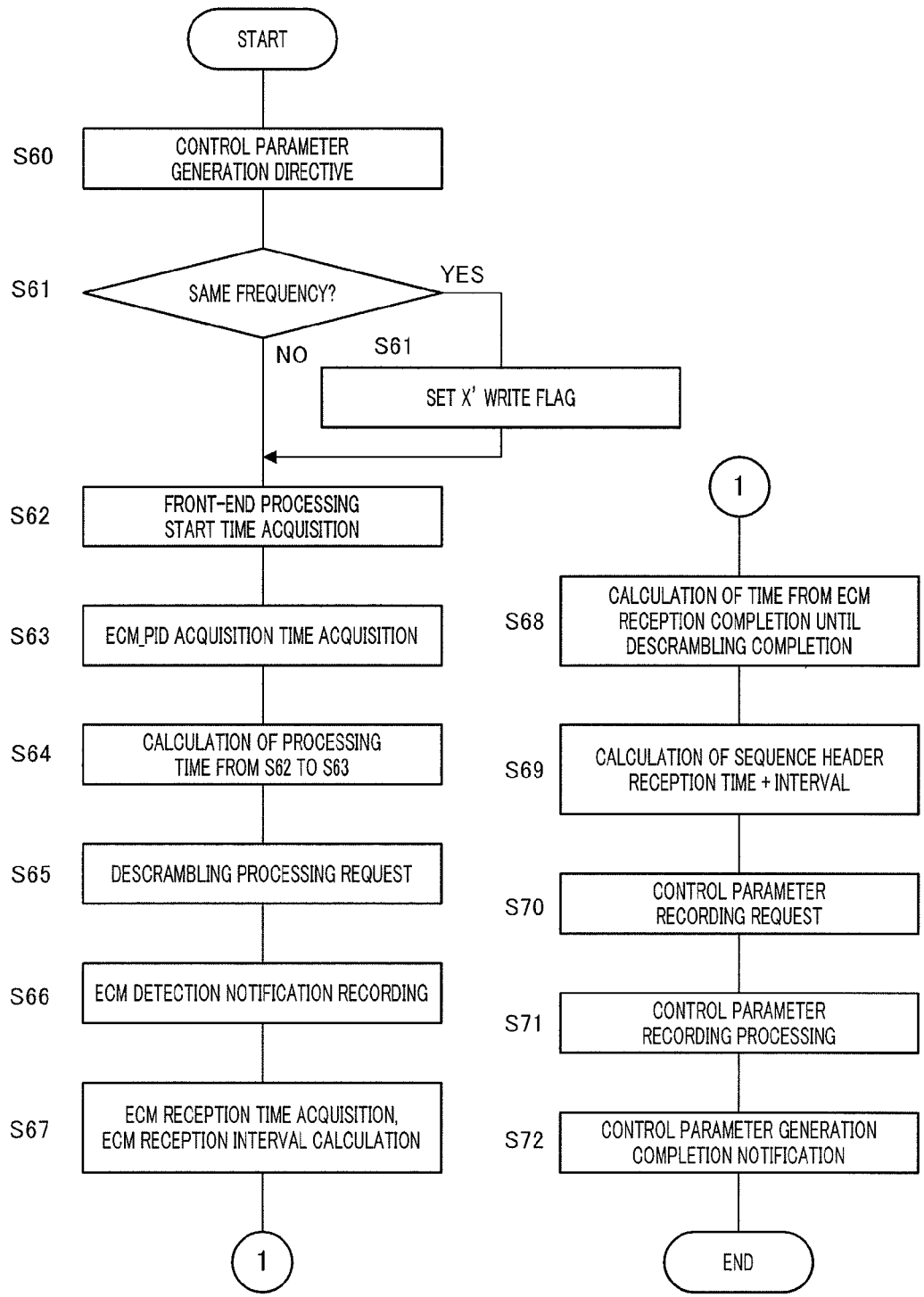
FIG. 32 is a flowchart showing a control parameter acquisition method of a digital broadcast reception apparatus according to above Embodiment 3.

FIG. 32 is a flowchart showing the control parameter acquisition method of digital broadcast reception apparatus 300.

Figure 33:
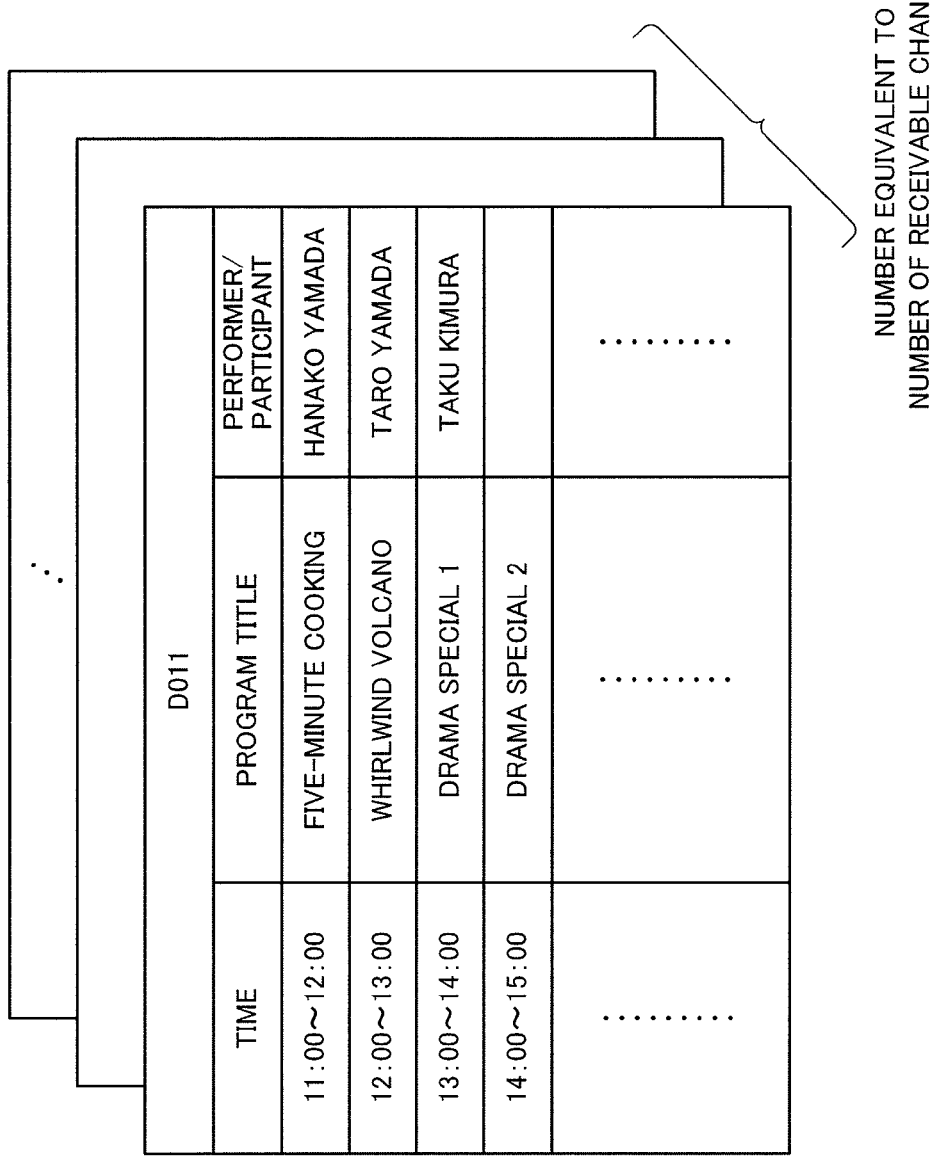
FIG. 33 is a drawing showing an example of service information that implements data broadcasting provided by a broadcasting station of a digital broadcast reception apparatus according to above Embodiment 3.

FIG. 33 is a drawing showing an example of service information that implements data broadcasting provided by a broadcasting station. FIG's. 34A and 34B are drawings showing examples of service information that implements data broadcasting provided by a broadcasting station. FIG. 34A and FIG. 34B show that there is multiplex broadcasting comprising a plurality of programs by the same broadcasting station.

In step S60, after system startup, data acquisition section 311 generates a control parameter generation request that includes a channel number, and outputs this request to channel switching directing section 310. When performing this control parameter generation, data acquisition section 311 acquires receivable channel numbers from service information stored in storage section 315 (see FIG. 33), generates a control parameter generation request for each channel, and inputs this to channel switching directing section 310. Here, it is assumed that it is demonstrated that multiplex broadcasting (simultaneous broadcasting of two programs by a broadcasting station using the same frequency) starts from a time of 12 o'clock as shown in the service information (FIG's. 34A and 34B), and this broadcasting is currently in progress.

Channel numbers included in a control parameter generation request to channel switching directing section 310 are rearranged so that identical frequencies are consecutive. For example, data acquisition section 311 performs control so that channel numbers using the same frequency are input in notification order to channel switching directing section 310 in the order D011-0→D011-1→D021 .... Here, the currently selected channel number is assumed to be D011-0.

In step S61, when a control parameter generation request is input, channel switching directing section 310 performs determination processing as to whether a channel number included in a control parameter generation request has the same frequency as the currently selected channel number. If the frequency is determined to be the same, channel switching directing section 310 sets an X' write flag so that X', which is a time period from the start of front-end processing until ECM_PID acquisition, is written to storage section 315. An example of a write flag is shown in FIG. 30.

In step S62, channel switching directing section 310 issues a processing time acquisition request to data acquisition section 311 in order to acquire the time immediately before front-end processing is initiated, and acquires the time at the time of the start of front-end processing. After step S62 ends, channel switching directing section 310 performs front-end processing (this processing is skipped if the X' write flag is set), program identification information acquisition processing, and ECM_PID acquisition processing.

In step S63, immediately after ECM_PID acquisition processing, channel switching directing section 310 issues a processing time acquisition request to data acquisition section 311 and acquires the time at the time of ECM_PID acquisition.

In step S64, data acquisition section 311 uses the times acquired in step S62 and step S63 to calculate a time period from the start of front-end processing until ECM_PID acquisition.

In step S65, after ECM_PID acquisition, channel switching directing section 310 outputs a descrambling processing request including an ECM_PID to descrambling processing section 104.

In step S66, when a descrambling setting request is input, descrambling processing section 104 sets an ECM_PID for ECM reception detection section 103, and performs an ECM reception timing notification procedure. By means of this procedure, ECM reception timing notification is given to descrambling processing section 104 by ECM reception detection section 103 each time an ECM is detected.

In step S67, data acquisition section 311 records the time of a first ECM reception completion notification by descrambling processing section 104, and derives an ECM reception interval from that recorded time and the time of a second ECM reception completion notification by descrambling processing section 104.

In step S68, when a descrambling processing completion notification is input from descrambling processing section 104, data acquisition section 311 calculates a time period from ECM reception completion until descrambling completion using the first ECM reception time.

In step S69, data acquisition section 311 calculates a sequence header interval from a first sequence header detection notification (a sequence header detection notification detected first after channel switching occurs) input from decoding processing section 106, and a sequence header detection notification given second.

In step S70, data acquisition section 311 issues a parameter recording request that includes the data derived in above steps S64, S67, S68, and S69 to parameter generation section 112.

In step S71, when a parameter recording request including a time period from the start of front-end processing until ECM_PID acquisition and a time period from ECM reception until completion of descrambling processing, an ECM reception time and ECM reception interval, and a sequence header reception time and sequence header reception interval, is input from data acquisition section 311, parameter generation section 112 performs processing whereby data for which there is a recording request is notified to and recorded in storage section 315 as the control parameters shown in FIG. 31.

Time X' from the start of front-end processing until ECM_PID acquisition and time Y from ECM reception until completion of descrambling processing are notified and recorded as control parameters (FIG. 31A), an ECM reception time and ECM reception interval are notified and recorded as control parameters (FIG. 31B), and a sequence header reception time and sequence header reception interval are notified and recorded as control parameters (FIG. 31C). When recording is completed, parameter generation section 112 outputs a recording completion notification to channel switching directing section 310.

In step S72, when a recording completion notification is input from parameter generation section 112, channel switching directing section 310 outputs a control parameter generation completion notification to data acquisition section 311, and resets the X' write flag. Channel switching directing section 310 performs the above processing for each channel.

A channel switching start timing decision method using control parameters will now be described.

Figure 35:
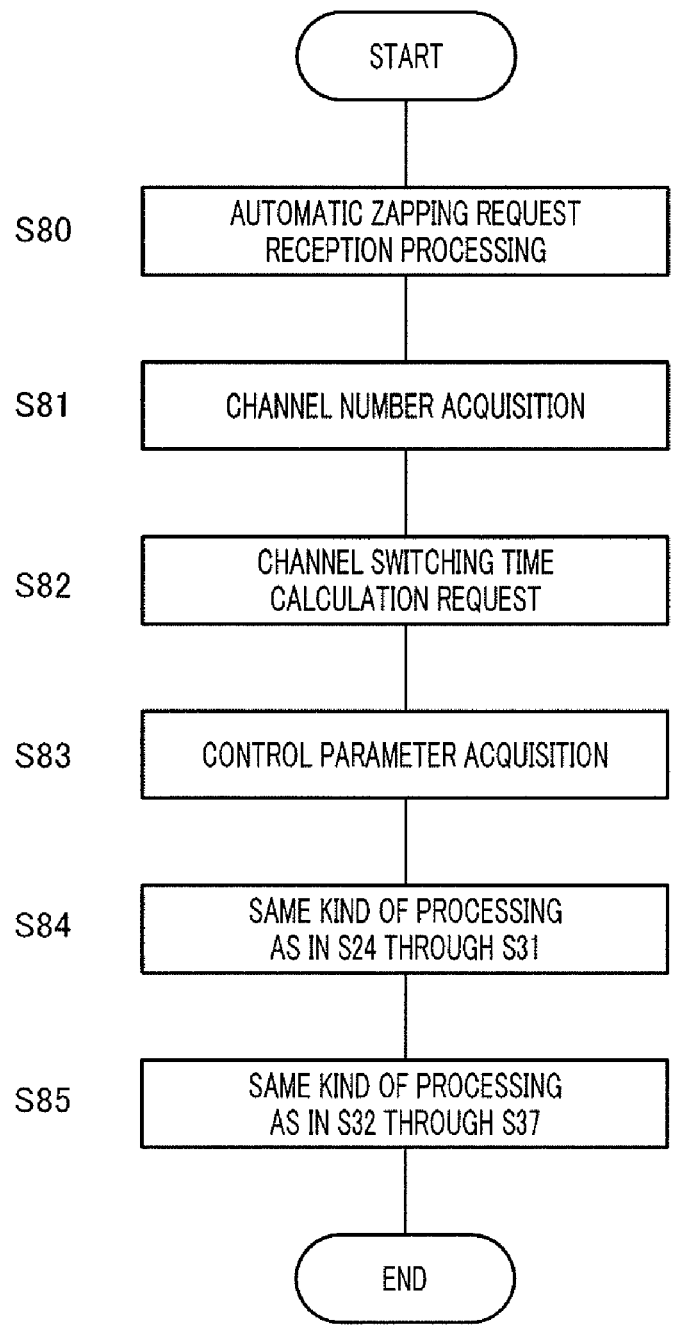
FIG. 35 is a flowchart showing channel switching start timing decision processing of a digital broadcast reception apparatus according to above Embodiment 3.

FIG. 35 is a flowchart showing channel switching start timing decision processing.

In step S80, input reception section 109 performs automatic zapping request reception processing. Specifically, on detecting an automatic zapping request signal (a signal generated when a zapping button for automatically zapping all channels is pressed) from an external control device such as a remote control, input reception section 109 acquires the service information shown in FIG. 33, generates an automatic zapping request that includes the channel numbers of all channels from the acquired service information, and outputs this to channel switching timing control section 114.

Here, an automatic zapping request is an instruction for performing zapping at certain fixed intervals for all channels for which acquisition is possible from service information (see FIG. 33). There are no particular restrictions on a signal detected by input reception section 109, which may be a normal station selection signal or the like as well as a zapping request signal. When a normal station selection signal is detected, an automatic zapping request that includes a specified channel number is generated from service information.

In step S81, when an automatic zapping request is input from input reception section 109, channel switching timing control section 114 performs processing that reads all channel numbers from service information stored in storage section 315 (see FIG. 33). There are no particular restrictions on order combinations in which station selection processing is performed, but in the following description it is assumed that the currently selected channel number is D011-0, and that station selection processing is performed in the following order: D011-0→D011-1→D021→D031→D041→D051→D061→D071.

In step S82, channel switching timing control section 114 outputs a channel switching time calculation request that includes the next channel number to be selected (D011-1) to processing time calculation section 313.

When a channel switching time calculation request that includes a channel number (D011-1) is input from channel switching timing control section 114, processing time calculation section 313 calculates channel switching times T1 and T2 for two channel switching start timing patterns. Channel switching start timing channel switching time T1 is a channel switching time when channel switching start timing is controlled based on an ECM reception wait time, and channel switching time T2 is a channel switching time when the timing at which channel switching is started is controlled based on a sequence header reception wait time.

First, the T1 calculation method will be described.

In step S83, processing time calculation section 313 first acquires from storage section 315 data of a channel number specified by a channel switching request from the control parameters in FIG. 31 stored in storage section 315. Here, when performing data acquisition from FIG. 31, processing time calculation section 313 performs processing that determines whether a channel number to be selected next has the same frequency. Here, processing time calculation section 313 references a frequency correspondence table for all channel numbers (see FIG. 29), and determines whether channel number D011-1 subject to selection has the same frequency.

If the frequency is the same, processing time calculation section 313 reads the value of X' as a time period from the start of front-end processing until ECM_PID acquisition from the control parameters (see FIG. 31A). That is to say, processing time calculation section 313 acquires channel number D011-1 sequence header related data (reference time 14:20:25:0, sequence header interval 450 ms), X: 300 ms, Y: 10 ms, and ECM related data (reference time 14:20:15:0, ECM reception interval 100 ms). If the channel number does not have the same frequency, the value of X, not X', is selected as a time period from front-end processing until ECM_PID acquisition. Here, X' is read for notification channel switching from D011-0 to D011-1 (channel switching within the same frequency).

In subsequent processing, channel switching time T1 can be calculated (step S84) by performing the same kind of processing as in steps S24 through S31 in previously described FIG. 20 (the processing being performed with "X" replaced by "X'").

At the next T2, channel switching time T2 can be calculated (step S85) by performing the same kind of processing as in steps S32 through S37 (the processing being performed with "X" replaced by "X'"). It is therefore possible to decide front-end processing start timing for which the channel switching time is minimal in the same way as in Embodiment 1.

Thus, according to Embodiment 3, even in a case in which notification channel switching occurs to a channel belonging to the same frequency as a currently selected channel, digital broadcast reception apparatus 300 can shorten a time period during which display is not possible by controlling the channel start timing so that a data wait time that occurs at the time of channel switching is shortened.

The above description presents examples of preferred embodiments of the present invention, but the scope of the present invention is not limited to these.

In the above embodiments, the terms "digital broadcast reception apparatus" and "digital broadcast reception method" have been used, but this is simply for convenience of description, and the terms "reception apparatus," "digital broadcast reception terminal," and "portable terminal" may, of course, also be used for an apparatus, and a term such as "channel switching control method" for a method.

The type, number, connection method, and so forth of sections—for example, a broadcast reception section and decoding processing section—configuring an above-described digital broadcast reception apparatus may be of any kind.

An above-described digital broadcast reception method is implemented by means of a program for causing this digital broadcast reception method to function. This program is stored in a computer-readable storage medium.

The function blocks used in the descriptions of a digital broadcast reception apparatus may be implemented as LSIs, which are integrated circuits. These may be implemented individually as single chips, or a single chip may incorporate some or all of them. Here, the term LSI has been used, but the terms IC, system LSI, super LSI, and ultra LSI may also be used according to differences in the degree of integration.

The method of implementing integrated circuitry is not limited to LSI, and implementation by means of dedicated circuitry or a general-purpose processor may also be used.

An FPGA for which programming is possible after LSI fabrication, or a reconfigurable processor allowing reconfiguration of circuit cell connections and settings within an LSI, may also be used.

In the event of the introduction of an integrated circuit implementation technology whereby LSI is replaced by a different technology as an advance in, or derivation from, semiconductor technology, integration of the function blocks may of course be performed using that technology. The application of biotechnology or the like is also a possibility.

The present invention has been described in detail and with reference to specific embodiments, but it will be clear to those skilled in the art that various variations and modifications may be possible without departing from the scope of the present invention.

The disclosure of Japanese Patent Application No. 2008-331458, filed on Dec. 25, 2008, including the specification, drawings and abstract, is incorporated herein by reference in its entirety.

INDUSTRIAL APPLICABILITY

A digital broadcast reception apparatus and digital broadcast reception method according to the present invention make it possible to shorten a data reception wait that occurs during channel switching processing in channel switching during digital broadcast reception, and to shorten a time period during which display is not possible. Also, a digital broadcast reception apparatus and program according to the present invention are suitable for use as a digital TV, recorder, or portable device.

REFERENCE SIGNS LIST 100, 200, 300 Digital broadcast reception apparatus
101 Broadcast reception section
102 Tuner
103 ECM reception detection section
104 Descrambling processing section
105 Demultiplexer processing section
106 Decoding processing section
107 Screen synthesizing section
108 Display section
109 Input reception section
110, 210, 310 Channel switching directing section
111, 311 Data acquisition section
112 Parameter generation section
113, 313 Processing time calculation section
114 Channel switching timing control section
115, 315 Storage section
116 Data acquisition timing control section

The invention claimed is:

1. A digital broadcast reception apparatus that is provided with a receiver that receives digital broadcasting and a channel switching processor that performs channel switching processing, the digital broadcast reception apparatus comprising:

a data acquirer that measures data relating to a data reception wait time that occurs in the channel switching processing;
a data acquisition timing controller that controls a timing of an operation of the data acquirer;
a parameter generator that generates a control parameter based on control information acquired by the data acquirer;
a processing time calculator that calculates a channel switching time, which is a period of time necessary for channel switching, obtained by subtracting a channel switching occurrence time from a channel switching completion time, based on the control parameter generated by the parameter generator; and
a channel switching timing controller that controls a channel switching start timing so that the data reception wait time that occurs at a time of the channel switching is shortened, based on the channel switching time calculated by the processing time calculator.

2. The digital broadcast reception apparatus according to claim 1, wherein the data acquirer measures one of a channel switching processing start time, control information relating to descrambling processing, and control information relating to stream decoding processing.

3. The digital broadcast reception apparatus according to claim 2, wherein:

the control information relating to descrambling processing is at least one of an entitlement control message reception completion time used for encryption key generation, an entitlement control message packet identifier acquisition time necessary for entitlement control message reception processing, an entitlement control message appearance timing, and an entitlement control message reception interval; and
the control information relating to stream decoding processing is one of a sequence header appearance timing and a sequence header reception interval.

4. The digital broadcast reception apparatus according to claim 2, wherein the channel switching processing start time is a time at which a channel switching request of a notification is generated to the channel switching processor or a time at which a front-end processing start request is generated to a tuner from the channel switching processor.

5. The digital broadcast reception apparatus according to claim 2, wherein the data acquirer performs measurement of a channel switching start time and the control information relating to the descrambling processing based on a notification from the channel switching processor.

6. The digital broadcast reception apparatus according to claim 2, wherein the data acquirer starts measurement of the control information relating to the descrambling processing based on a notification from a descrambler.

7. The digital broadcast reception apparatus according to claim 6, wherein the period of time necessary for the channel switching is a time period from a station selection start until entitlement control message packet identifier acquisition and a time period from completion of entitlement control message reception until completion of descrambling setting.

8. The digital broadcast reception apparatus according to claim 2, wherein the data acquirer starts measurement of the control information relating to the stream decoding processing based on a notification from a decoding processor.

9. The digital broadcast reception apparatus according to claim 2, wherein the parameter generator calculates the period of time necessary for the channel switching based on one of a channel switching start time acquired by the data acquirer and the control information relating to the descrambling processing.

10. The digital broadcast reception apparatus according to claim 2, wherein the processing time processor sets the channel switching start timing based on the control information relating to the descrambling processing, based on the control parameter generated by the parameter generator, and calculates the channel switching time at that time.

11. The digital broadcast reception apparatus according to claim 1, wherein the data acquirer measures the control information when a channel change is accompanied by a frequency change and when the channel change is not accompanied by the frequency change.

12. The digital broadcast reception apparatus according to claim 11, wherein the control information is one of a channel switching processing start time and information necessary for descrambling processing.

13. The digital broadcast reception apparatus according to claim 1, wherein the data acquisition timing controller periodically issues the data acquisition request based on program information such as an electronic program guide.

14. The digital broadcast reception apparatus according to claim 1, wherein the data acquirer, when there are a plurality of tuners, references a utilization situation of those tuners and decides a tuner to be used for data acquisition.

15. The digital broadcast reception apparatus according to claim 14, wherein the data acquirer, when having a plurality of tuners, performs the data acquisition using all tuners that are not being used.

16. The digital broadcast reception apparatus according to claim 14, wherein the data acquirer, when having a plurality of tuners, performs the data acquisition using an unused tuner even during normal viewing.

17. The digital broadcast reception apparatus according to claim 1, wherein the channel switching timing controller sets the channel switching start timing based on the control information relating to the stream decoding processing, based on the control parameter generated by the parameter generator, and calculates the channel switching time.

18. The digital broadcast reception apparatus according to claim 1, wherein the channel switching timing controller compares calculated channel switching times, and issues a channel switching start request at the channel switching start timing for which the channel switching time is minimal.

19. A digital broadcast reception method to receive digital broadcasting and perform channel switching processing, the digital broadcast reception method comprising:
    measuring data relating to a data reception wait time that occurs in the channel switching processing;
    controlling a timing of a data acquisition operation;
    generating a control parameter based on acquired control information;
    calculating a channel switching time, which is a period of time necessary for channel switching obtained by subtracting a channel switching occurrence time from a channel switching completion time, based on the generated control parameter; and
    controlling a channel switching start timing so that the data reception wait time that occurs at a time of the channel switching is shortened, based on the calculated channel switching time.

* * * * *